(12) United States Patent
Ogihara et al.

(10) Patent No.: US 10,476,101 B2
(45) Date of Patent: *Nov. 12, 2019

(54) ELECTRICAL DEVICE

(71) Applicant: NISSAN MOTOR CO., LTD., Yokohama-shi, Kanagawa (JP)

(72) Inventors: Wataru Ogihara, Kanagawa (JP); Shinji Yamamoto, Kanagawa (JP); Hideaki Tanaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,250

(22) PCT Filed: Jan. 24, 2014

(86) PCT No.: PCT/JP2014/051526
§ 371 (c)(1),
(2) Date: Jul. 21, 2016

(87) PCT Pub. No.: WO2015/111187
PCT Pub. Date: Jul. 30, 2015

(65) Prior Publication Data
US 2017/0012316 A1    Jan. 12, 2017

(51) Int. Cl.
*H01M 4/36* (2006.01)
*H01M 4/38* (2006.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
CPC .. H01M 10/0525; H01M 4/131; H01M 4/134; H01M 4/364; H01M 4/386;
(Continued)

(56) References Cited

U.S. PATENT DOCUMENTS

| 4,560,524 A | 12/1985 | Smuckler |
| 6,300,013 B1 | 10/2001 | Yamada et al. |
(Continued)

FOREIGN PATENT DOCUMENTS

| CN | 1272698 A | 11/2000 |
| CN | 1444301 A | 9/2003 |
(Continued)

OTHER PUBLICATIONS

Extended European Search Report dated Dec. 3, 2014, from the corresponding European Patent Application No. 12856913.4, 3 pages.

(Continued)

*Primary Examiner* — Gregg Cantelmo
(74) *Attorney, Agent, or Firm* — Foley & Lardner lLP

(57) ABSTRACT

To improve cycle durability in an electrical device such as a lithium ion secondary battery including a negative electrode containing a silicon-containing negative electrode active material, an electrical device includes a power generating element containing a unit cell layer. The unit cell contains a positive electrode in which a positive electrode active material layer containing a positive electrode active material is formed on a surface of a positive electrode current collector, a negative electrode in which a negative electrode active material layer containing a silicon-containing negative electrode active material is formed on a surface of a negative electrode current collector, and a separator. In the unit cell layer, the electrical device satisfies formula (1): $0.91 \leq C/A < 0.99$ where the area of the negative electrode active material layer is A [m$^2$] and the area of the positive electrode active material layer is C [m$^2$].

5 Claims, 2 Drawing Sheets

(51) Int. Cl.
  *H01M 4/48* (2010.01)
  *H01M 10/42* (2006.01)
  *H01M 4/131* (2010.01)
  *H01M 4/133* (2010.01)
  *H01M 4/134* (2010.01)
  *H01M 4/505* (2010.01)
  *H01M 4/525* (2010.01)
  *H01M 4/587* (2010.01)
  *H01M 10/052* (2010.01)
  *H01M 10/058* (2010.01)
  *H01M 10/0525* (2010.01)

(52) U.S. Cl.
  CPC ........... *H01M 4/134* (2013.01); *H01M 4/364* (2013.01); *H01M 4/386* (2013.01); *H01M 4/483* (2013.01); *H01M 4/505* (2013.01); *H01M 4/525* (2013.01); *H01M 4/587* (2013.01); *H01M 10/052* (2013.01); *H01M 10/058* (2013.01); *H01M 2010/4292* (2013.01); *Y02T 10/7011* (2013.01)

(58) Field of Classification Search
  CPC ...... H01M 4/483; H01M 4/505; H01M 4/525; H01M 10/052; H01M 10/058; H01M 2010/4292; H01M 4/587; Y02T 10/7011
  See application file for complete search history.

(56) References Cited

U.S. PATENT DOCUMENTS

| | | |
|---|---|---|
| 6,680,143 B2 | 1/2004 | Thackeray et al. |
| 6,685,804 B1 | 2/2004 | Ikeda et al. |
| 6,699,336 B2 | 3/2004 | Turner et al. |
| 7,141,187 B2 | 11/2006 | Kosuzu et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,316,792 B2 | 1/2008 | Kosuzu et al. |
| 7,378,041 B2 | 5/2008 | Asao et al. |
| 7,410,728 B1 | 8/2008 | Fujimoto et al. |
| 7,425,285 B2 | 9/2008 | Asao et al. |
| 7,479,351 B2 | 1/2009 | Matsubara et al. |
| 7,732,095 B2 | 6/2010 | Christensen et al. |
| 7,794,881 B1 | 9/2010 | Fujimoto et al. |
| 7,803,290 B2 | 9/2010 | Kosuzu et al. |
| 7,811,709 B2 | 10/2010 | Musha et al. |
| 7,851,086 B2 | 12/2010 | Matsubara et al. |
| 7,972,727 B2 | 7/2011 | Christensen et al. |
| 8,216,720 B2 | 7/2012 | Fukui et al. |
| 8,221,918 B2 | 7/2012 | Katsura et al. |
| 8,394,534 B2 | 3/2013 | Lopez et al. |
| 8,475,959 B2 | 7/2013 | Venkatachalam et al. |
| 8,741,485 B2 | 6/2014 | Lopez et al. |
| 8,916,295 B2 | 12/2014 | Ito et al. |
| 9,070,935 B2 | 6/2015 | Murata et al. |
| 9,263,733 B2 | 2/2016 | Wakizaka et al. |
| 9,325,003 B2 | 4/2016 | Watanabe et al. |
| 9,496,065 B2* | 11/2016 | Ito ..................... H01M 4/364 |
| 9,603,245 B2 | 3/2017 | Suzuki et al. |
| 9,680,150 B2* | 6/2017 | Yamamoto ........... H01M 4/133 |
| 9,954,252 B2* | 4/2018 | Ogihara ............... H01M 4/364 |
| 2002/0044800 A1 | 4/2002 | Kimura |
| 2002/0071991 A1 | 6/2002 | Kweon et al. |
| 2003/0148185 A1 | 8/2003 | Kusumoto et al. |
| 2003/0157407 A1 | 8/2003 | Kosuzu et al. |
| 2004/0029012 A1 | 2/2004 | Tanizaki et al. |
| 2004/0137327 A1* | 7/2004 | Gross .................. B22F 1/0003 429/231.8 |
| 2004/0191630 A1 | 9/2004 | Kawamura et al. |
| 2005/0208379 A1 | 9/2005 | Musha et al. |
| 2005/0244711 A1 | 11/2005 | Fukui et al. |
| 2006/0115735 A1 | 1/2006 | Yasuda et al. |
| 2006/0035149 A1 | 2/2006 | Nanba et al. |
| 2006/0040182 A1 | 2/2006 | Kawakami et al. |
| 2006/0051675 A1 | 3/2006 | Musha et al. |
| 2006/0105242 A1 | 5/2006 | Sato et al. |
| 2006/0237697 A1 | 10/2006 | Kosuzu et al. |
| 2007/0048612 A1 | 3/2007 | Nakajima et al. |
| 2007/0128517 A1 | 6/2007 | Christensen et al. |
| 2007/0148544 A1 | 6/2007 | Le |
| 2007/0200101 A1 | 8/2007 | Asao et al. |
| 2008/0003503 A1 | 1/2008 | Kawakami et al. |
| 2008/0090152 A1 | 4/2008 | Kosuzu et al. |
| 2008/0118837 A1* | 5/2008 | Shirane ................ H01M 4/131 429/221 |
| 2009/0061322 A1 | 3/2009 | Kawakami et al. |
| 2009/0092892 A1 | 4/2009 | Yamaguchi et al. |
| 2009/0098458 A1 | 4/2009 | Fujii et al. |
| 2009/0239151 A1 | 9/2009 | Nakanishi et al. |
| 2009/0297951 A1 | 12/2009 | Katsura et al. |
| 2010/0009258 A1 | 1/2010 | Hasegawa et al. |
| 2010/0075226 A1 | 3/2010 | Pham et al. |
| 2010/0119942 A1 | 5/2010 | Kumar |
| 2010/0167126 A1 | 7/2010 | Christensen et al. |
| 2010/0178571 A1 | 7/2010 | Nanba et al. |
| 2010/0203396 A1 | 8/2010 | Murata |
| 2010/0233543 A1* | 9/2010 | Numata ................ H01M 4/131 429/224 |
| 2010/0270497 A1 | 10/2010 | Hezeque et al. |
| 2010/0288077 A1 | 11/2010 | Le |
| 2010/0323098 A1 | 12/2010 | Kosuzu et al. |
| 2011/0052985 A1 | 3/2011 | Kashiwazaki et al. |
| 2011/0084229 A1 | 4/2011 | Kawakami et al. |
| 2011/0183173 A1 | 7/2011 | Muraoka et al. |
| 2011/0281180 A1 | 11/2011 | Kim et al. |
| 2012/0153220 A1 | 6/2012 | Watanabe et al. |
| 2012/0175551 A1 | 7/2012 | Watanabe et al. |
| 2012/0200200 A1 | 8/2012 | Jung et al. |
| 2012/0208087 A1* | 8/2012 | Yamamoto ........... H01M 4/485 429/223 |
| 2012/0276446 A1 | 11/2012 | Kawai |
| 2012/0301786 A1 | 11/2012 | Takamuku et al. |
| 2013/0048340 A1 | 2/2013 | Bando et al. |
| 2013/0089783 A1 | 4/2013 | Yoo et al. |
| 2013/0108922 A1 | 5/2013 | Shinozaki et al. |
| 2013/0136986 A1 | 5/2013 | Scoyer et al. |
| 2013/0202967 A1 | 8/2013 | Kim et al. |
| 2013/0240800 A1 | 9/2013 | Watanabe et al. |
| 2013/0288122 A1 | 10/2013 | Matsushima et al. |
| 2013/0295438 A1 | 11/2013 | Itoh |
| 2013/0337332 A1 | 12/2013 | Ito et al. |
| 2013/0341560 A1 | 12/2013 | Watanabe et al. |
| 2014/0017564 A1 | 1/2014 | Suzuki et al. |
| 2014/0086788 A1 | 3/2014 | Watanabe et al. |
| 2014/0086792 A1 | 3/2014 | Watanabe et al. |
| 2014/0099229 A1 | 4/2014 | Watanabe et al. |
| 2014/0319414 A1 | 10/2014 | Watanabe et al. |
| 2014/0353546 A1 | 12/2014 | Watanabe et al. |
| 2014/0356718 A1 | 12/2014 | Ito et al. |
| 2014/0374666 A1 | 12/2014 | Watanabe et al. |
| 2015/0044513 A1 | 2/2015 | Endoh et al. |
| 2015/0295228 A1 | 10/2015 | Yamamoto et al. |
| 2015/0303450 A1 | 10/2015 | Miki et al. |
| 2015/0303451 A1 | 10/2015 | Miki et al. |
| 2015/0303455 A1 | 10/2015 | Watanabe et al. |
| 2015/0303464 A1 | 10/2015 | Watanabe et al. |
| 2015/0303465 A1 | 10/2015 | Watanabe et al. |
| 2015/0303466 A1 | 10/2015 | Yamamoto et al. |
| 2015/0311500 A1 | 10/2015 | Miki et al. |
| 2015/0311517 A1 | 10/2015 | Yamamoto et al. |
| 2016/0285076 A1 | 9/2016 | Yamamoto et al. |
| 2016/0285077 A1 | 9/2016 | Miki et al. |
| 2016/0285088 A1 | 9/2016 | Watanabe et al. |
| 2016/0336593 A1* | 11/2016 | Honda ................. H01M 4/134 |
| 2017/0005362 A1 | 1/2017 | Nakagawa et al. |
| 2017/0012287 A1 | 1/2017 | Yamamoto |

(56) References Cited

U.S. PATENT DOCUMENTS

| | | | |
|---|---|---|---|
| 2017/0012316 A1 | 1/2017 | Ogihara et al. | |
| 2017/0012320 A1 | 1/2017 | Ogihara et al. | |

FOREIGN PATENT DOCUMENTS

| | | | | |
|---|---|---|---|---|
| CN | 1663065 | A | 8/2005 | |
| CN | 1714463 | A | 12/2005 | |
| CN | 1765024 | A | 4/2006 | |
| CN | 1770513 | A | 5/2006 | |
| CN | 101179126 | A | 5/2008 | |
| CN | 101233632 | A | 7/2008 | |
| CN | 101593828 | A | 12/2009 | |
| CN | 102326284 | A | 1/2012 | |
| CN | 102760872 | A | 10/2012 | |
| CN | 104170127 | A | 11/2014 | |
| EP | 1 313 158 | A2 | 5/2003 | |
| EP | 2 717 356 | A1 | 4/2014 | |
| EP | 2 717 357 | A1 | 4/2014 | |
| EP | 2 793 301 | A1 | 10/2014 | |
| EP | 2 800 176 | A1 | 11/2014 | |
| JP | 08-250117 | A | 9/1996 | |
| JP | 2000-113885 | A | 4/2000 | |
| JP | 2000-299108 | A | 10/2000 | |
| JP | 2001-196052 | A | 7/2001 | |
| JP | 2002-083594 | A | 3/2002 | |
| JP | 2003-331826 | A | 11/2003 | |
| JP | 2004-119199 | A | 4/2004 | |
| JP | 2004-178922 | A | 6/2004 | |
| JP | 2004-185810 | A | 7/2004 | |
| JP | 2004-185984 | A | 7/2004 | |
| JP | 2004-228059 | A | 8/2004 | |
| JP | 2004-296412 | A | 10/2004 | |
| JP | 2004-311428 | A | 11/2004 | |
| JP | 2004-311429 | A | 11/2004 | |
| JP | 2005-011650 | A | 1/2005 | |
| JP | 2005-011699 | A | 1/2005 | |
| JP | 2005-044672 | A | 2/2005 | |
| JP | 2005-078999 | A | 3/2005 | |
| JP | 2005-116390 | A | 4/2005 | |
| JP | 2006-120324 | A | 5/2006 | |
| JP | 2006-216277 | A | 8/2006 | |
| JP | 2007-026805 | A | 2/2007 | |
| JP | 2007-026926 | A | 2/2007 | |
| JP | 2007-149604 | A | 6/2007 | |
| JP | 2007-305424 | A | 11/2007 | |
| JP | 2008-004535 | A | 1/2008 | |
| JP | 2008-016446 | A | 1/2008 | |
| JP | 2009-032644 | A | 2/2009 | |
| JP | 2009-517850 | A | 4/2009 | |
| JP | 2009-099328 | A | 5/2009 | |
| JP | 2009-224239 | A | 10/2009 | |
| JP | 2009-238663 | A | 10/2009 | |
| JP | 2010-135336 | A | 6/2010 | |
| JP | 2010-205609 | A | 9/2010 | |
| JP | 2011-048969 | A | 3/2011 | |
| JP | 2012-033475 | A | 2/2012 | |
| JP | 2012-094454 | A | 5/2012 | |
| JP | 4954717 | B2 | 6/2012 | |
| JP | 2012-142154 | A | 7/2012 | |
| JP | 2012-151106 | A | 8/2012 | |
| JP | 2012-185913 | A | 9/2012 | |
| JP | 5 046302 | B2 | 10/2012 | |
| JP | 2012-248286 | A | 12/2012 | |
| JP | 2013-131432 | A | 7/2013 | |
| JP | 2013-161785 | A | 8/2013 | |
| JP | 2013-225502 | A | 10/2013 | |
| KR | 10-2003-0041816 | A | 5/2003 | |
| KR | 10-2005-0075449 | A | 7/2005 | |
| KR | 2005-0075449 | A | 7/2005 | |
| KR | 10-2008-0019801 | A | 3/2008 | |
| KR | 10-2008-0032037 | A | 4/2008 | |
| KR | 10-2012-0081987 | A | 7/2012 | |
| KR | 10-2012-0089845 | A | 8/2012 | |
| KR | 10-2013-0128008 | A | 11/2013 | |
| KR | 2013-0128008 | A | 11/2013 | |
| TW | 201203673 | A1 | 1/2012 | |
| TW | 201206826 | A1 | 2/2012 | |
| WO | WO-2004/004031 | A1 | 1/2004 | |
| WO | WO-2004/086539 | A1 | 10/2004 | |
| WO | WO-2007/015508 | A1 | 2/2007 | |
| WO | WO-2008/086041 | A1 | 7/2008 | |
| WO | WO-2008/097723 | A1 | 8/2008 | |
| WO | WO-2010/150513 | A1 | 12/2010 | |
| WO | WO-2011/065503 | A1 | 6/2011 | |
| WO | WO-2011/065504 | A1 | 6/2011 | |
| WO | WO-2012/000854 | A1 | 1/2012 | |
| WO | WO 2012/070306 | A1 | 5/2012 | |
| WO | WO-2012/121240 | A1 | 9/2012 | |
| WO | WO-2012/160858 | A1 | 11/2012 | |
| WO | WO-2012/161190 | A1 | 11/2012 | |
| WO | WO-2012160866 | A1 * | 11/2012 | ............ H01M 4/38 |
| WO | WO-2013005737 | A1 * | 1/2013 | ........... H01M 4/364 |
| WO | WO-2013/055646 | A1 | 4/2013 | |
| WO | WO-2013/088846 | A1 | 6/2013 | |
| WO | WO 2013/094465 | A1 | 6/2013 | |
| WO | WO-2013/099440 | A1 | 7/2013 | |
| WO | WO-2013/099441 | A1 | 7/2013 | |
| WO | WO-2013/115390 | A1 | 8/2013 | |
| WO | WO-2013/145913 | A1 | 10/2013 | |

OTHER PUBLICATIONS

G. Kobayashi, K. Shibukawa, Y. Irii, F. Matsumoto, A. Ito, Y. Ohsawa, M. Hatano, Y. Sato. "Surface Coating Effect on Electrochemical Performance of Li-Rich Layered Li[Li0.2Ni0.183Co0.03Mn0.583]O2 Formed Oxide Coating Thereon", The Electrochemical Society of Japan Dai 79 Kai Taikai Koen Yoshishu, Mar. 29, 2012, p. 115.

Hatchard et al., "Electrochemical Performance of SiAlSn Films Prepared by Combinatorial Sputtering," Electrochemical and Solid-State Letters, vol. 6, No. 7, 2003, pp. A129-A132.

Japanese Office Action and English language translation dated Jan. 26, 2015, 4 pgs.

Korean Office Action, Application No. 10-2016-7019739, dated Dec. 1, 2017, 5 pages.

Korean Office Action, Application No. 10-2016-7019742, dated Dec. 15, 2017, 7 pages.

M. A. Al-Maghrabi et al., A Combinatorial Study of the Sn—Si—C System for Li-Ion Battery Applications, Journal of the Electrochemical Society, vol. 159, No. 6, Apr. 2, 2012, pp. A711-A719.

S. Yoon, C.-M. Park, H. Kim, H.-J. Sohn. Electrochemical Properties of Si—Zn—C Composite as an Anode Material for Lithium-Ion Batteries, Journal of Power Sources 167 (2007) 520-523.

Supplementary European Search Report dated Nov. 4, 2014, 5 pgs.

Taiwanese Office Action dated Feb. 24, 2014, (6 pgs.).

Taiwanese Office Action, dated Mar. 19, 2014, 4 pages.

USPTO Notice of Allowance, U.S. Appl. No. 14/442,289, dated Dec. 28, 2018, 12 pages.

USPTO Office Action, U.S. Appl. No. 14/442,289, dated Jul. 30, 2018, 13 pages.

USPTO Office Action, U.S. Appl. No. 14/119,062, dated Feb. 15, 2019, 8 pages.

USPTO Office Action, U.S. Appl. No. 14/119,062, dated Nov. 21, 2018, 15 pages.

USPTO Office Action, U.S. Appl. No. 14/119,379, dated Jan. 7, 2016, 6 pages.

USPTO Office Action, U.S. Appl. No. 14/119,379, dated Apr. 15, 2016, 6 pages.

USPTO Office Action, U.S. Appl. No. 14/119,379, dated Oct. 9, 2015, 7 pages.

USPTO Office Action, U.S. Appl. No. 14/119,379, dated Feb. 10, 2015, 6 pages.

USPTO Office Action, U.S. Appl. No. 14/119,379, dated May 18, 2015,7 pages.

USPTO Office Action, U.S. Appl. No. 14/442,289, dated Feb. 20, 2018, 9 pages.

USPTO Office Action, U.S. Appl. No. 14/442,661, dated Jul. 17, 2018, 11 pages.

(56) References Cited

OTHER PUBLICATIONS

USPTO Office Action, U.S. Appl. No. 14/442,661, dated Dec. 2, 2016, 10 pages.
USPTO Office Action, U.S. Appl. No. 14/442,661, dated Sep. 19, 2017, 9 pages.
USPTO Office Action, U.S. Appl. No. 14/442,678, dated Feb. 28, 2018, 32 pages.
USPTO Office Action, U.S. Appl. No. 14/442,678, dated Mar. 7, 2019, 32 pages.
USPTO Office Action, U.S. Appl. No. 14/442,678, dated Aug. 16, 2018, 32 pages.
USPTO Office Action, U.S. Appl. No. 14/442,678, dated Aug. 21, 2017, 23 pages.
USPTO Office Action, U.S. Appl. No. 14/442,957, dated Apr. 3, 2018, 13 pages.
USPTO Office Action, U.S. Appl. No. 14/442,957, dated Sep. 21, 2017, 11 pages.
USPTO Office Action, U.S. Appl. No. 14/442,957, dated Dec. 19, 2016, 14 pages.
USPTO Office Action, U.S. Appl. No. 14/443,151, dated Mar. 20, 2019, 22 pages.
USPTO Office Action, U.S. Appl. No. 14/443,151, dated Jun. 13, 2016, 12 pages.
USPTO Office Action, U.S. Appl. No. 14/443,151, dated Jun. 15, 2018, 13 pages.
USPTO Office Action, U.S. Appl. No. 14/443,151, dated Jun. 22, 2017, 14 pages.
USPTO Office Action, U.S. Appl. No. 14/443,151, dated Nov. 28, 2016, 16 pages.
USPTO Office Action, U.S. Appl. No. 14/443,151, dated Oct. 19, 2017, 14 pages.
USPTO Office Action, U.S. Appl. No. 14/443,236, dated Nov. 16, 2018, 15 pages.
USPTO Office Action, U.S. Appl. No. 14/443,236, dated May 15, 2018, 38 pages.
USPTO Office Action, U.S. Appl. No. 14/443,572, dated Feb. 14, 2018, 26 pages.
USPTO Office Action, U.S. Appl. No. 14/443,572, dated Feb. 21, 2019, 22 pages.
USPTO Office Action, U.S. Appl. No. 14/443,572, dated Apr. 21, 2017, 16 pages.
USPTO Office Action, U.S. Appl. No. 14/443,572, dated Jun. 29, 2018, 41 pages.
USPTO Office Action, U.S. Appl. No. 14/443,572, dated Sep. 11, 2017, 13 pages.
USPTO Office Action, U.S. Appl. No. 14/443,572, dated Oct. 14, 2016, 25 pages.
USPTO Office Action, U.S. Appl. No. 14/443,852, dated May 9, 2018, 27 pages.
USPTO Office Action, U.S. Appl. No. 14/443,852, dated Jun. 2, 2017, 19 pages.
USPTO Office Action, U.S. Appl. No. 14/443,852, dated Sep. 28, 2017, 17 pages.
USPTO Office Action, U.S. Appl. No. 14/443,852, dated Oct. 17, 2016, 17 pages.
USPTO Office Action, U.S. Appl. No. 14/443,852, dated Dec. 29, 2016, 14 pages.
USPTO Office Action, U.S. Appl. No. 14/646,218, dated Jan. 9, 2018, 23 pages.
USPTO Office Action, U.S. Appl. No. 14/646,218, dated May 9, 2018, 33 pages.
USPTO Office Action, U.S. Appl. No. 14/646,218, dated May 10, 2017, 22 pages.
USPTO Office Action, U.S. Appl. No. 14/646,218, dated Sep. 8, 2017, 13 pages.
USPTO Office Action, U.S. Appl. No. 14/646,218, dated Oct. 14, 2016, 22 pages.
USPTO Office Action, U.S. Appl. No. 14/646,218, dated Nov. 19, 2018, 14 pages.
USPTO Office Action, U.S. Appl. No. 14/646,242, dated Jan. 7, 2019, 18 pages.
USPTO Office Action, U.S. Appl. No. 14/646,242, dated Jan. 11, 2018, 8 pages.
USPTO Office Action, U.S. Appl. No. 14/646,242, dated Apr. 19, 2018, 11 pages.
USPTO Office Action, U.S. Appl. No. 14/646,242, dated Aug. 10, 2018, 11 pages.
USPTO Office Action, U.S. Appl. No. 14/646,433, dated May 31, 2018, 15 pages.
USPTO Office Action, U.S. Appl. No. 14/646,433, dated Dec. 22, 2017, 17 pages.
USPTO Office Action, U.S. Appl. No. 14/646,590, dated May 8, 2018, 22 pages.
USPTO Office Action, U.S. Appl. No. 14/646,590, dated Aug. 28, 2018, 23 pages.
USPTO Office Action, U.S. Appl. No. 15/112,725, dated Apr. 8, 2019, 14 pages.
USPTO Office Action, U.S. Appl. No. 15/112,725, dated Jun. 15, 2018, 14 pages.
USPTO Office Action, U.S. Appl. No. 15/112,725, dated Oct. 23, 2018, 18 pages.
USPTO Office Action, U.S. Appl. No. 15/112,725, dated Nov. 24, 2017, 10 pages.
USPTO Office Action, U.S. Appl. No. 15/113,096, dated Jan. 14, 2019, 30 pages.
USPTO Restriction Office Action, U.S. Appl. No. 14/442,678, dated May 18, 2017, 7 pages.
USPTO Office Action, U.S. Appl. No. 15/113,096, dated May 16, 2019, 18 pages.
Cho et al., Zero-Strain Intercalation Cathode for Rechargeable Li-Ion Cell, A Journal of the German Chemical Society, vol. 40, Issue 18, Sep. 17, 2001, pp. 3367-3369 (Year: 2001).
USPTO Notice of Allowance. U.S. Appl. No. 15/112,725, dated Aug. 26, 2019, 11 pages.
USPTO Office Action, U.S. Appl. No. 15/113,096, dated Sep. 3, 2019, 17 pages.

* cited by examiner

ELECTRICAL DEVICE

TECHNICAL FIELD

The present invention relates to an electrical device. The electrical device according to the present invention is used for a driving power source or an auxiliary power source of a motor serving as, for example, a secondary battery or a capacitor for use in a vehicle such as an electric vehicle, a fuel cell vehicle, or a hybrid electric vehicle.

BACKGROUND ART

Recently, there has been a strong demand for reduction of the amount of carbon dioxide in order to deal with global warming. In the automobile industry, the reduction of emissions of carbon dioxide is highly expected in association with the spread of electric vehicles (EV) and hybrid electric vehicles (HEV). Thus, development of electrical devices such as secondary batteries for driving motors as a key to practical application of such vehicles is actively being carried out.

The secondary batteries for driving motors are required to have quite high output performance and high energy as compared with lithium ion secondary batteries for general use in mobile phones, laptop computers and the like. Therefore, lithium ion secondary batteries having the highest theoretical energy among all types of batteries are gaining more attention, and they are now being rapidly developed.

A lithium ion secondary battery generally has a constitution in which a positive electrode including a positive electrode current collector to which a positive electrode active material and the like is applied on both surfaces with use of a binder is connected, via an electrolyte layer, to a negative electrode including a negative electrode current collector to which a negative electrode active material and the like is applied on both surfaces with use of a binder, and the battery is housed in a battery case.

In a lithium ion secondary battery of a related art, a carbon.graphite-based material, which is advantageous in terms of charge and discharge cycle life or cost, has been used for the negative electrode. However, the carbon.graphite-based negative electrode material has the disadvantage that a theoretical charge and discharge capacity equal to or larger than 372 mAh/g, which is obtained from $LiC_6$ as a compound introduced with maximum amount of lithium, cannot be ensured because the battery is charged and discharged by absorbing lithium ions into graphite crystals and desorbing the lithium ions therefrom. Thus, by use of the carbon.graphite-based negative electrode material, it is difficult to ensure a capacity and energy density that are high enough to satisfy vehicle usage on the practical level.

On the other hand, a battery using a $SiO_x$ ($0<x<2$) material, which can form a compound with Li, for a negative electrode has a higher energy density than the carbon.graphite-based negative electrode material of a related art. Therefore, such a negative electrode material is highly expected to be used for a battery in a vehicle. For example, in silicon oxide having a chemical composition of $SiO_x$, Si (nanoparticles of monocrystal) and non-crystalline (amorphous) $SiO_2$ are present as separate phases when it is observed at microscopic level.

The silicon oxide has a tetrahedral structure as a unit structure. Silicon compounds other than $SiO_2$ (intermediate oxide) can be expressed as $Si_2O$, $SiO$, or $Si_2O_3$ corresponding to oxygen number of 1, 2, or 3 at the corner of the tetrahedron. However, as these intermediate oxides are thermodynamically unstable, it is very difficult for them to be present as a monocrystal. Thus, $SiO_x$ has a non-crystalline structure in which the unit structures are randomly arranged, and such a non-crystalline structure is formed such that plural non-crystalline compounds are present without forming an interface, and it is mainly composed of a homogeneous non-crystalline structure part. Thus, $SiO_x$ has a structure in which Si nanoparticles are dispersed in non-crystalline $SiO_2$.

In the case of such $SiO_x$, only Si is involved with charging and discharging, and $SiO_2$ is not involved with charging and discharging. Thus, $SiO_x$ indicates average composition of them. In $SiO_x$, while 1 mol of Si absorbs and desorbs 4.4 mol of lithium ions in accordance with the reaction formula (A) and a reversible capacity component of $Li_{22}Si_5$ ($=Li_{4.4}Si$) with a theoretical capacity of 4200 mAh/g is generated, there is a significant problem that, when 1 mol of a SiO absorbs and desorbs 4.3 mol of lithium ions in accordance with the reaction formula (B), $Li_4SiO_4$ as a cause of having irreversible capacity is generated together with $Li_{4.4}Si$ during initial Li absorption.

[Chem. 1]

$$Si+4.4Li^+ + e^- \Leftrightarrow Li_{4.4}Si \tag{A}$$

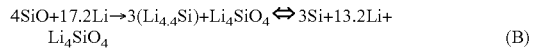

$$4SiO + 17.2Li \rightarrow 3(Li_{4.4}Si) + Li_4SiO_4 \Leftrightarrow 3Si + 13.2Li + Li_4SiO_4 \tag{B}$$

Meanwhile, examples of a lithium silicate compound containing Li include $Li_ySiO_x$ ($0<y$, $0<x<2$) such as $Li_4SiO_4$, $Li_2SiO_3$, $Li_2Si_2O_5$, $Li_2Si_3O_8$, and $Li_6Si_4O_{11}$. However, since these $Li_ySiO_x$ have very small electron conductivity and $SiO_2$ has no electron conductivity, there is a problem of having increased negative electrode resistance. As a result, it becomes very difficult for lithium ions to get desorbed from a negative electrode active material or get absorbed into a negative electrode active material.

However, in a lithium ion secondary battery using the material alloyed with Li for the negative electrode, expansion-shrinkage in the negative electrode is large at the time of charging and discharging. For example, volumetric expansion of the graphite material in the case of absorbing Li ions is approximately 1.2 times. However, the Si material has a problem of a decrease in cycle life of the electrode due to a large volumetric change (approximately 4 times) which is caused by transition from an amorphous state to a crystal state when Si is alloyed with Li. In addition, when using the Si negative electrode active material, the battery capacity has a trade-off relationship with cycle durability. Thus, there has been a problem that it is difficult to increase the capacity and improve the cycle durability concurrently.

In order to deal with the problems described above, there is known a negative electrode for a lithium ion secondary battery containing $SiO_x$ and a graphite material (for example, see Patent Literature 1). According to the invention described in the Patent Literature 1, it is described in paragraph [0018] that, by having $SiO_x$ at minimum content, not only the high capacity but also good cycle lifetime can be exhibited.

CITATION LIST

Patent Literature

Patent Literature 1: Japanese Translation of PCT International Application Publication No. JP-T-2009-517850

SUMMARY OF THE INVENTION

Technical Problem

The above Patent Literature 1 describes that a lithium ion secondary battery using a negative electrode containing $SiO_x$ and a carbon material can exhibit excellent cycle characteristics. However, according to studies by the present inventors, it has been found that sufficient cycle durability cannot be necessarily achieved even when such a negative electrode containing a silicon-containing negative electrode active material is used.

An object of the present invention is to provide a means for further improving cycle durability in an electrical device such as a lithium ion secondary battery including a negative electrode containing a silicon-containing negative electrode active material.

The present inventors made intensive studies in order to solve the above-described problems. As a result, the present inventors have found that the above-described problem can be solved by controlling a ratio between an area of a positive electrode active material layer and an area of a negative electrode active material layer constituting a unit cell layer of an electrical device to a value within a predetermined range, and have completed the present invention.

That is, the present invention relates to an electrical device having a power generating element including a unit cell layer containing a positive electrode in which a positive electrode active material layer containing a positive electrode active material is formed on the surface of a positive electrode current collector, a negative electrode in which a negative electrode active material layer containing a silicon-containing negative electrode active material is formed on the surface of a negative electrode current collector, and a separator.

The electrical device according to the present invention is characterized by satisfying formula (1): $0.91 \leq C/A < 1$ in the one or more unit cell layers constituting the power generating element when the area of the negative electrode active material layer is A [m$^2$] and the area of the positive electrode active material layer is C [m$^2$].

Advantageous Effect of the Invention

The present invention suppresses an irreversible change due to movement of Li occluded by a negative electrode active material layer during charging from a positive electrode facing region to a positive electrode non-facing region in the negative electrode active material layer. As a result, an electrical device which prevents reduction in battery capacity in accordance with repeated charge and discharge cycles, and has excellent cycle durability is provided.

DESCRIPTION OF EMBODIMENTS

Figure 1:
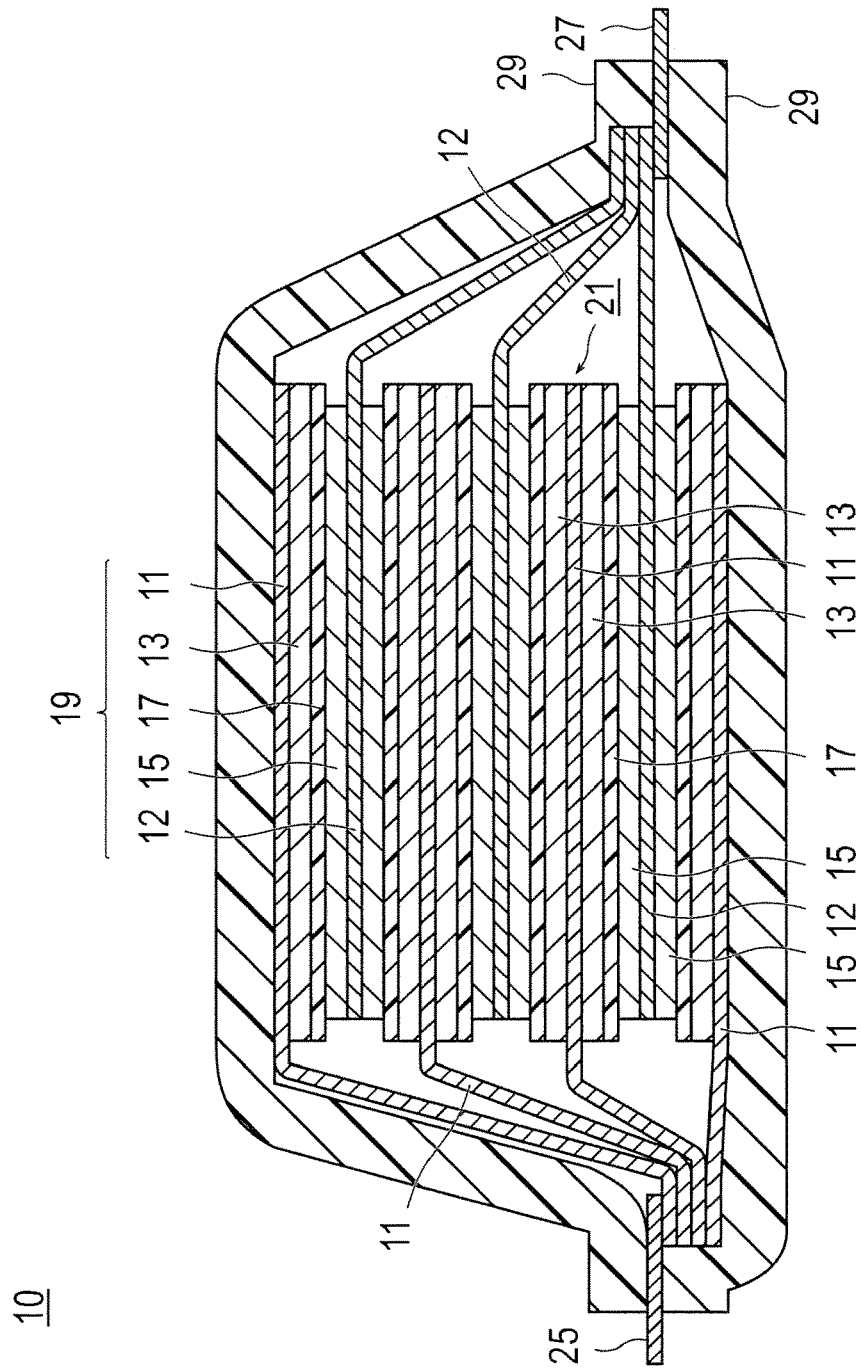
FIG. 1 is a schematic cross-sectional view illustrating the basic structure of a non-aqueous electrolyte lithium ion secondary battery, which is flat type (laminate type) and not a bipolar type, as one embodiment of the electrical device according to the present invention.

An aspect of the present invention provides an electrical device which has a power generating element including a unit cell layer containing a positive electrode in which a positive electrode active material layer containing a positive electrode active material is formed on the surface of a positive electrode current collector, a negative electrode in which a negative electrode active material layer containing a silicon-containing negative electrode active material is formed on the surface of a negative electrode current collector, and a separator. The electrical device satisfies formula (1): $0.91 \leq C/A < 1$ in the one or more unit cell layers constituting the power generating element when the area of the negative electrode active material layer is A [m$^2$] and the area of the positive electrode active material layer is C [m$^2$].

Hereinbelow, the basic structure of the electrical device according to the present invention is described. In this embodiment, descriptions are given by exemplifying a lithium ion secondary battery as an electrical device.

First, because a lithium ion secondary battery obtained by using the electrical device according to the present invention has large cell (single battery layer) voltage so that high energy density and high output density can be achieved. Thus, the lithium ion secondary battery of this embodiment is suitable for a driving power source or an auxiliary power source for a vehicle. Accordingly, it can be desirably used as a lithium ion secondary battery for a driving power source and the like for use in a vehicle. Further, it can be applied appropriately to lithium ion secondary batteries for mobile devices such as mobile phones.

For example, when the lithium ion secondary battery is classified in terms of the shape and structure, the lithium ion secondary battery may be applicable to any batteries having known shapes and structures such as a laminate type (flat type) battery and a wound type (cylindrical type) battery. The structure of the laminate type (flat type) battery contributes to ensuring long-term reliability by a simple sealing technology such as simple thermo-compression bonding, and therefore it has the advantage in terms of cost and workability.

Furthermore, in terms of electrical connection (electrode structure) inside the lithium ion secondary battery, the lithium ion secondary battery may be applicable not only to a non-bipolar (internal parallel connection type) battery but also to a bipolar (internal serial connection type) battery.

When the lithium ion secondary battery is classified in terms of the type of an electrolyte layer used therein, the lithium ion secondary battery may be applicable to batteries including various types of known electrolyte layers such as a solution electrolyte type battery in which a solution electrolyte such as a non-aqueous electrolyte solution is used for an electrolyte layer and a polymer battery in which a polymer electrolyte is used for an electrolyte layer. The polymer battery is classified into a gel electrolyte type battery using a polymer gel electrolyte (also simply referred to as a gel electrolyte) and a solid polymer (all solid state) type battery using a polymer solid electrolyte (also simply referred to as a polymer electrolyte).

Therefore, in the following descriptions, as an example of a lithium ion secondary battery according to this embodiment, a non-bipolar (internal parallel connection type) lithium ion secondary battery will be described briefly with reference to the drawings. However, the technical scope of the electrical device according to the present invention and lithium ion secondary battery according to this embodiment should not be limited to the following descriptions.

<Overall Structure of Battery>

FIG. 1 is a schematic cross-sectional view showing the entire configuration of a flat (laminate type) lithium ion secondary battery (hereinafter, also simply referred to as a "laminate type battery") which is one representative embodiment of the electrical device according to the present invention.

As shown in FIG. 1, a laminate type battery 10 according to this embodiment has a configuration in which a substantially rectangular power generating element 21, in which a charging and discharging reaction actually progresses, is sealed inside a laminated sheet 29 as a battery outer casing. The power generating element 21 has a configuration in which a positive electrode having a positive electrode active material layer 13 provided on both surfaces of a positive electrode current collector 11, electrolyte layers 17, and a negative electrode having a negative electrode active material layer 15 provided on both surfaces of a negative electrode current collector 12 are laminated. Specifically, the positive electrode, the electrolyte layer, and the negative electrode are laminated in this order such that one positive electrode active material layer 13 faces an adjacent negative electrode active material layer 15 with the electrolyte layer 17 interposed therebetween.

Accordingly, the positive electrode, the electrolyte layer, and the negative electrode that are adjacent to one another constitute a single battery layer 19. Thus, it can be also said that the laminate type battery 10 shown in FIG. 1 has a configuration in which the plural single battery layers 19 are laminated so as to be electrically connected in parallel. Meanwhile, although the outermost positive electrode current collector located on both outermost layers of the power generating element 21 is provided with the positive electrode active material layer 13 only on one side thereof, the outermost positive electrode current collector may be provided with the active material layer on both sides thereof. That is, it is not limited to a current collector having an active material layer formed only on one surface to be used exclusively for the outermost layer, and a current collector provided with the active material layers on both sides thereof may be also used by itself. Furthermore, it is also possible that, by reversing the arrangement of the positive electrode and the negative electrode shown in FIG. 1, the outermost negative electrode current collector is present on both outermost sides of the power generating element 21 and the negative electrode active material layer is arranged on a single side or both sides of the corresponding outermost negative electrode current collector.

A positive electrode current collecting plate 25 and a negative electrode current collecting plate 27 which are electrically conductive to the respective electrodes (the positive electrodes and the negative electrodes) are attached to the positive electrode current collector 11 and the negative electrode current collector 12, respectively. The positive electrode current collecting plate 25 and the negative electrode current collecting plate 27 are held by being inserted between the respective end portions of the laminated sheet 29 and exposed to the outside of the laminated sheet 29. The positive electrode current collecting plate 25 and the negative electrode current collecting plate 27 may be attached to the positive electrode current collector 11 and the negative electrode current collector 12 of the respective electrodes via a positive electrode lead and a negative electrode lead (not shown in the figure) as appropriate by, for example, ultrasonic welding or resistance welding.

The lithium ion secondary battery according to the present embodiment is characterized by structures of the positive electrode and the negative electrode. Main constituent members of the battery including the positive electrode and negative electrode will be described below.

<Active Material Layer>

The active material layer (13,15) includes an active material, and further includes another additive, if necessary.

[Positive Electrode Active Material Layer]

The positive electrode active material layer 13 contains a positive electrode active material. The kind of the positive electrode active material is not particularly limited, conventionally known knowledge thereof can be appropriately referred to. If necessary, two or more positive electrode active materials may be used in combination. As the positive electrode active material, a positive electrode active material formed of a solid solution material (here, also referred to as "solid solution positive electrode active material") is preferably contained as a positive electrode active material capable of achieving a high electric capacity and energy density. As another positive electrode active material, a Li.Co-based composite oxide such as $LiCoO_2$, a Li.Ni-based composite oxide such as $LiNiO_2$, a Li.Mn-based composite oxide such as spinel $LiMn_2O_4$, a Li.Fe-based composite oxide such as $LiFeO_2$, and the like can be used. In addition, a phosphate compound or a sulfate compound of a transition metal and lithium, such as $LiFePO_4$, a transition metal oxide or sulfide, such as $V_2O_5$, $MnO_2$, $TiS_2$, $MoS_2$, or $MoO_3$, $PbO_2$, AgO, NiOOH, or the like can be used. The solid solution positive electrode active material which is a preferable positive electrode active material will be described in more detail below.

(Solid Solution Positive Electrode Active Material)

The solid solution positive electrode active material has a composition represented by the following formula (3) as a basic structure.

[Mathematical Formula 1]

$$Li_{1.5}[Ni_aMn_bCo_c[Li]_d]O_z \qquad (3)$$

In formula (3), z represents the number of oxygen atoms satisfying a valence, and a+b+c+d=1.5, 0.1≤d≤0.4, and 1.1≤[a+b+c] 1.4.

Here, the phrase "the solid solution positive electrode active material has a composition represented by formula (3) as a basic structure" is a concept including not only a case where an active material having a composition represented by formula (3) itself is used as the solid solution positive electrode active material but also a case where an active material obtained by appropriately modifying an active material having a composition represented by formula (3) to such a degree to be confirmed to be derived from the active material having the composition is used as the solid solution positive electrode active material. Here, examples of the latter case include the following three forms of (A) to (C).

(A): A form in which one or more elements M selected from the group consisting of Al, Zr, Ti, Nb, B, S, Sn, W, Mo, and V are present on particle surfaces of the solid solution positive electrode active material having a composition represented by (3) in an amount satisfying 0.002≤[M]/[a+b+c]≤0.05 when the amount of presence of the element M is [M].

In form (A), a form in which the element M is present is not particularly limited. In addition to a form of an oxide, a form of a compound with Li or the like can be assumed, but the form of an oxide is preferable. The average particle diameter of particles of a material containing the element M (oxide or the like) is preferably from 5 to 50 nm. When the element M is present in a form of an oxide, the oxide is scattered on particle surfaces of the solid solution positive electrode active material. As described above, the average particle diameter of the oxide scattered in this way is preferably from 5 to 50 nm, and also the oxide may be flocculated on particle surfaces of the solid solution positive electrode active material to form a secondary particle. The average particle diameter of such secondary particle is preferably from 0.1 μm (100 nm) to 1 μm (1000 nm).

Here, in order to dope particle surfaces of a solid solution positive electrode active material with the element M as in form (A), for example, the following method can be used. That is, an oxide containing the element M for doping itself or a sol of the oxide is mixed with an active material at a predetermined ratio. The resulting mixture is subjected to a treatment at a temperature of about 100 to 150° C. for about 5 to 20 hours as necessary, and is further subjected to a treatment at a temperature of about 200 to 300° C. for about 3 to 10 hours.

(B): A form in which a coating layer formed of an oxide of a metal selected from the group consisting of Al, Zr, and Ti or a composite oxide thereof is formed on particle surfaces of the solid solution positive electrode active material having a composition represented by formula (3) (in this case, the content of the oxide or the composite oxide in the coated solid solution positive electrode active material is from 0.1 to 3.0% by weight in terms of oxide); and, in form (B), a specific structure of the metal oxide present on particle surfaces of the solid solution positive electrode active material is not particularly limited, a theoretically possible oxide or composite oxide containing the above metal element may be used. $Al_2O_3$, $ZrO_2$, or $TiO_2$ is preferably used. The coating layer may further include a (composite) oxide containing another element such as one or more elements selected from the group consisting of Nb, Sn, W, Mo, and V.

(C): A form in which the solid solution positive electrode active material having a composition represented by formula (3) has a composition represented by $Li_{1.5}[Ni_aMn_bCo_c[Li]_d[X]_e]O_z$ as a result of substitution of a Mn atom contained in the solid solution positive electrode active material with at least one selected from the group consisting of Ti, Zr, and Nb (in the formula, X is at least one selected from the group consisting of Ti, Zr, and Nb, $0.01 \leq e \leq 0.4$, $a+b+c+d+e=1.5$, $0.1 \leq d \leq 0.4$, $1.1 \leq [a+b+c+e] \leq 1.4$, and represents the number of oxygen atoms satisfying a valence).

In form (C), the solid solution positive electrode active material after being substituted preferably has diffraction peaks indicating a rock salt type layered structure at 20 to 230, 35 to 400 (101), 42 to 450 (104) and 64 to 650 (108)/65 to 66° (110) in the X ray diffraction (XRD) measurement. In this case, in order to certainly obtain an effect of improving the cycle property, it is preferable that the positive electrode active material does not substantially have a peak other than the diffraction peak attributed to the rock salt type layered structure. More preferably, the positive electrode active material has three diffraction peaks at 35 to 400 (101) and one diffraction peak at 42 to 45° (104). However, each of the diffraction peaks may not necessarily be counted as the three peeks and the one peak as long as it is attributed to the diffraction peak of the rock salt type layered structure. The measuring method to be described in Examples below is employed for the X ray diffraction measurement. Incidentally, the notation of 64 to 650 (108)/65 to 66° (110) is intended to include a case in which there are two close peaks at 64 to 65 and 65 to 66 and thus the two close peaks are not clearly separated but present as one broad peak depending on the composition.

In form (C), the solid solution positive electrode active material after being substituted also preferably has a plurality of specific diffraction peaks in the X ray diffraction (XRD) measurement. The solid solution positive electrode active material with above composition formula is a solid solution system of $Li_2MnO_3$ and $LiMnO_2$, and the diffraction peak at 20 to 23° is a super lattice diffraction peak that is characteristic for $Li_2MnO_3$ among the plurality of diffraction peaks specified above. In addition, the diffraction peaks at 36.5 to 37.5° (101), 44 to 450 (104) and 64 to 65° (108)/65 to 660 (110) are usually the peaks that are characteristic for the rock salt type layered structure of $LiMnO_2$. In addition, in this embodiment, it is preferable to have three diffraction peaks at 35 to 400 (101) and one diffraction peak at 42 to 450 (104) as a part of the diffraction peaks indicating the rock salt type layered structure. It is preferable that a material which has a peak other than the diffraction peaks indicating the rock salt type layered structure, for example, another peak derived from impurities or the like in these angle ranges is not contained in the solid solution positive electrode active material of this embodiment. The presence of such another peak means that a structure other than the rock salt type layered structure is included in the positive electrode active material. An effect of improving the cycle property can be more certainly obtained when a structure other than the rock salt type layered structure is not included.

An average particle diameter of the positive electrode active material contained in the positive electrode active material layer 13 is not particularly limited; however, in view of higher output performance, the average particle diameter is preferably in the range from 1 μm to 30 μm, more preferably in the range from 5 μm to 20 μm. Note that, in the present specification, "the particle diameter" represents the maximum length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may also be determined in the same manner.

As described above, the positive electrode active material layer preferably contains a solid solution positive electrode active material, and preferably contains a positive electrode active material (solid solution positive electrode active material) represented by the following formula (2).

[Mathematical formula 2]

$$e \text{ (solid solution positive electrode active material)} \qquad (2)$$

In the formula (2), e indicates % by weight of each component in the positive electrode active material layer, and it satisfies $80 \leq e \leq 98$.

As is evident from the formula (2), it is essential that the content of the solid solution positive electrode active material in the positive electrode active material layer is 80 to 98% by weight. However, it is preferably 84 to 98% by weight.

Furthermore, it is preferable that, in addition to the solid solution positive electrode active material layer described above, a binder and a conductive aid are contained in the positive electrode active material layer. Furthermore, if necessary, it may contain other additives including an electrolyte (for example, polymer matrix, ion conductive polymer, and electrolyte solution) and lithium salt for increasing ion conductivity.

(Binder)

The binder used in the positive electrode active material layer is not particularly limited. Examples of the binder include: a thermoplastic polymer such as polyethylene, polypropylene, polyethylene terephthalate (PET), polyethernitrile, polyacrylonitrile, polyimide, polyamide, cellulose, carboxymethyl cellulose (CMC) and a salt thereof, an ethylene-vinyl acetate copolymer, polyvinyl chloride, styrene butadiene rubber (SBR), isoprene rubber, butadiene rubber, ethylene propylene rubber, an ethylene propylene diene copolymer, a styrene-butadiene-styrene block copolymer and a hydrogen additive thereof, and a styrene-isoprene-styrene block copolymer and a hydrogen additive thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber); and an epoxy resin. These binders may be used either singly or in combination of two or more types.

Content of the binder contained in the positive electrode active material layer is preferably 1 to 10% by weight, and more preferably 1 to 8% by weight.

(Conductive Aid)

The conductive aid is an additive to be mixed for improving conductivity of the positive electrode active material layer or negative electrode active material layer. Examples of the conductive aid include carbon black like Ketjen black and acetylene black. If the active material layer contains a conductive aid, the electron network in the inside of the active material layer is effectively formed, thereby contributing to the improvement of output property of a battery.

Content of the conductive aid in the positive electrode active material layer is preferably 1 to 10% by weight, and more preferably 1 to 8% by weight. As the blending ratio (content) of the conductive aid is defined in the aforementioned range, the following effects are exhibited. Namely, as the electron conductivity is sufficiently ensured without inhibiting an electrode reaction, a decrease in energy density caused by decreased electrode density can be suppressed, and also an increase in energy density based on improved electrode density can be obtained.

(Other Components)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conducting polymer include a polyethylene oxide (PEO)-based polymer and a polypropylene oxide (PPO)-based polymer.

The positive electrode (positive electrode active material layer) may be formed by a method of applying (coating) ordinary slurry thereto, or by any of a kneading method, a sputtering method, a vapor deposition method, a CVD method, a PVD method, an ion plating method, and a thermal spraying method.

[Negative Electrode Active Material Layer]

The negative electrode active material layer 15 contains a silicon-containing negative electrode active material. The kind of the silicon-containing negative electrode active material is not particularly limited. Conventionally known knowledge thereof can be appropriately referred to. If necessary, two or more negative electrode active materials may be used in combination. The silicon-containing negative electrode active material preferably contains $SiO_x$ or a Si-containing alloy (also referred to as "Si material" collectively) essentially, and more preferably contains a Si material together with a carbon material as a negative electrode active material capable of achieving a high electric capacity and energy density. The Si material which is a preferable silicon-containing negative electrode active material and the carbon material preferably used together will be described in more detail below.

Here, the Si material means $SiO_x$ which is a mixture of amorphous $SiO_2$ particles and Si particles (x represents the number of oxygen atoms satisfying a valence of Si) and a Si-containing alloy. These compounds may be used either singly or in combination of two or more kinds thereof as the Si material. Hereinafter, the Si material will be described in detail.

($SiO_x$)

$SiO_x$ is a mixture of amorphous $SiO_2$ particles and Si particles, and x represents the number of oxygen atoms satisfying a valence of Si. A specific value of x is not particularly limited, but can be set appropriately.

The above $SiO_x$ may be formed of conductive $SiO_x$ particles obtained by coating surfaces of $SiO_x$ particles with a conductive material by a mechanical surface fusion treatment. By such a structure, Si in $SiO_x$ particles removes or inserts a lithium ion easily, and a reaction of an active material can proceed more smoothly. In this case, the content of the conductive material in the conductive $SiO_x$ particles is preferably from 1 to 30% by weight, and more preferably from 2 to 20% by weight.

The average particle diameter of the above $SiO_x$ is only required to be about the same as that of a negative electrode active material contained in the existing negative electrode active material layer 15, and is not particularly limited. The average particle diameter of $SiO_x$ is only required to be preferably from 1 to 20 μm from a viewpoint of high output. However, the average particle diameter of $SiO_x$ is not limited to the above range in any way, but it is needless to say that the average particle diameter of $SiO_x$ may be outside the above range as long as an effect of the present embodiment can be exhibited effectively. The shape of $SiO_x$ is not particularly limited, but may be spherical, elliptical, cylindrical, polygonal, scale-like, irregular, or the like.

Method for Manufacturing $SiO_x$

A method for manufacturing $SiO_x$ according to the present embodiment is not particularly limited, and $SiO_x$ can be manufactured using various conventionally known manufacturing methods. That is, there is little difference in an amorphous state and characteristics between manufacturing methods, and therefore any manufacturing method can be applied.

Examples of a method for preparing $SiO_x$ include the following methods. First, Si powder and $SiO_2$ powder are blended at a predetermined ratio as a raw material, and the powder is mixed, granulated, and dried to obtain a mixed granulated raw material. The mixed granulated raw material is heated in an inert gas atmosphere (830° C. or higher) or heated in a vacuum (1,100° C. or higher and 1,600° C. or lower) to generate (sublimate) SiO. The gaseous SiO generated by sublimation is vapor-deposited on a precipitation substrate (the temperature of the substrate is 450° C. or higher and 800° C. or lower) to precipitate a SiO precipitate. Thereafter, the SiO precipitate is removed from the precipitation substrate, and is ground using a ball mill or the like to obtain $SiO_x$ powder.

A value of x can be determined by fluorescent X-ray analysis. For example, a value of x can be determined using a fundamental parameter method in fluorescent X-ray analysis using an O—Kα ray. In fluorescent X-ray analysis, for example, RIX3000 manufactured by Rigaku Denki Kogyo Co., Ltd. can be used. As conditions for fluorescent X-ray analysis, for example, rhodium (Rh) is used as a target, and it is only required to set a tube voltage to 50 kV and set a tube current to 50 mA. A value of x obtained here is calculated using the intensity of the O—Kα ray detected in a measurement region on the substrate, and therefore is an average value in the measurement region.

(Si-Containing Alloy)

The Si-containing alloy is not particularly limited as long as it is an alloy with other metal containing Si, and reference can be suitably made to public knowledge of a related art. Herein, preferred examples of the Si-containing alloy include $Si_xTi_yGe_zA_a$, $Si_xTi_yZn_zA_a$, $Si_xTi_ySn_zA_a$, $Si_xSn_yAl_zA_a$, $Si_xSn_yV_zA_a$, $Si_xSn_yC_zA_a$, $Si_xZn_yV_zA_a$, $Si_xZn_ySn_zA_a$, $Si_xZn_yAl_zA_a$, $Si_xZn_yC_zA_a$, $Si_xAl_yC_zA_a$, and $Si_xAl_yNb_zA_a$ (in the formula, A indicates an inevitable impurity, x, y, z and a represent values of % by weight and satisfy the conditions of 0<x<100, 0<y<100, 0<z<100, 0≤a<0.5, and x+y+z+a=100). By using those Si-containing alloys for the negative electrode active material and suitably selecting a predetermined first addition element and a predetermined second addition element, amorphous-crystal phase transition at the time of the alloying with Li can be suppressed so that the cycle lifetime can be extended. In addition, the negative electrode active material thus obtained has a higher capacity than conventional negative electrode active materials such as carbon-based negative electrode active materials.

(Carbon Material)

The carbon material which may be used in the present invention is not particularly limited, and examples thereof include graphite, which is highly crystalline carbon, such as natural graphite or artificial graphite; low crystalline carbon such as soft carbon or hard carbon; carbon black such as Ketjen black, acetylene black, channel black, lamp black, oil furnace black, or thermal black; and a carbon material such as fullerene, carbon nanotube, carbon nanofiber, carbon nanohorn, or carbon fibril. Among them, it is preferable to use graphite.

In the present embodiment, by use of the Si material or a carbon material, or by use in combination thereof as the negative electrode active material, higher cycle durability, a high initial capacity, and well-balanced characteristics can be exhibited.

Particularly, $SiO_x$ is necessarily disposed uniformly in the negative electrode active material layer. In such a case, the potentials or the capacities exhibited by $SiO_x$ are different from one another. As a result, $SiO_x$ which reacts with a lithium ion excessively, and SiO, which does not react with a lithium ion are generated, among $SiO_x$ in the negative electrode active material layer. That is, non-uniformity of a reaction of $SiO_x$ in the negative electrode active material layer with a lithium ion is occurred. An excessive action of $SiO_x$ which reacts with a lithium ion excessively among the above alloys may thereby cause decomposition of an electrolytic solution due to a significant reaction with the electrolytic solution or destruction of the structure of $SiO_x$ due to excessive expansion. As a result, even when $SiO_x$ having excellent characteristics is used, for example, in a case where the $SiO_x$ is not disposed uniformly, cycle characteristics may be deteriorated as a negative electrode for an electrical device.

However, mixing the $SiO_x$ with a carbon material can solve the above problem. More specifically, mixing $SiO_x$ with a carbon material can dispose the $SiO_x$ uniformly in the negative electrode active material layer. As a result, it is considered that any $SiO_x$ in the negative electrode active material layer exhibits a similar reactivity, and deterioration of cycle characteristics can be prevented.

As a result of mixing the carbon material, the content of $SiO_x$ in the negative electrode active material layer is reduced, and the initial capacity may be thereby reduced. However, the carbon material itself has a reactivity with a lithium ion, and therefore the degree of reduction in the initial capacity is relatively small. That is, the negative electrode active material according to the present embodiment has a larger effect for improving cycle characteristics than the action for reducing the initial capacity.

The carbon material hardly changes in volume during a reaction with a lithium ion compared with $SiO_x$. Therefore, even when the change of $SiO_x$ in volume is large, an influence by the change of the negative electrode active material in volume in accordance with a lithium reaction can be relatively small when the negative electrode active material is seen as a whole. Such an effect can be understood also from results of Examples that a larger content of the carbon material (smaller content of $SiO_x$) makes cycle characteristics higher.

Containing the carbon material can improve a consumed electric quantity (Wh). More specifically, the carbon material has a relatively lower potential than $SiO_x$. As a result, a relatively high potential of $SiO_x$ can be reduced. The potential of the entire negative electrode is thereby reduced, and therefore the consumed electric quantity (Wh) can be improved. Such an action is particularly advantageous, for example, in use for vehicles among electrical devices.

The shape of the carbon material is not particularly limited, and may be spherical, elliptical, cylindrical, polygonal, scale-like, irregular, or the like.

The average particle diameter of the carbon material is, although not particularly limited, preferably from 5 to 25 µm, more preferably from 5 to 10 µm. In this case, compared to the average particle diameter of the $SiO_x$ described above, the average particle diameter of the carbon material may be the same as or different from the average particle diameter of $SiO_x$, but is preferably different from that of $SiO_x$. Particularly, it is more preferable that the average particle diameter of $SiO_x$ is smaller than the average particle diameter of the carbon material. If the average particle diameter of the carbon material is relatively larger than the average particle diameter of $SiO_x$, it is possible to have a structure in which particles of the carbon material are disposed uniformly, and $SiO_x$ is disposed among the particles of the carbon material, and thus $SiO_x$ can be disposed uniformly in the negative electrode active material layer.

A ratio of particle diameter between the average particle diameter of the carbon material and the average particle diameter of $SiO_x$ (average particle diameter of $SiO_x$/average particle diameter of carbon material) is preferably from 1/250 to less than 1, and more preferably from 1/100 to 1/4.

According to circumstances, a negative electrode active material other than the two kinds of a negative electrode active material described above (Si material and carbon material) may be used in combination. Examples of the negative electrode active material which may be used in combination include $SiO_x$, a lithium-transition metal composite oxide (for example, $Li_4TiO_{12}$), a metal material, and a lithium alloy-based negative electrode material. It is needless to say that a negative electrode active material other than those can be also used.

As described above, the negative electrode active material layer preferably contains both a Si material and a carbon material, and preferably contains a negative electrode active material represented by the following formula (4).

[Mathematical formula 3]

$$\alpha \text{ (Si material)} + \beta \text{ (carbon material)} \qquad (4)$$

In formula (4), the Si material is formed of one or more kinds selected from the group consisting of $SiO_x$ which is a mixture of amorphous $SiO_2$ particles and Si particles (x represents the number of oxygen atoms satisfying a valence of Si) and a Si-containing alloy, $\alpha$ and $\beta$ each represent % by weight of each component in the negative electrode active material layer, and $80 \leq \alpha+\beta \leq 98$, $3 \leq \alpha \leq 40$, and $40 \leq \beta \leq 95$.

As it is evident from the formula (4), the content of Si material as the negative electrode active material is 3 to 40% by weight in the negative electrode active material layer. Furthermore, the content of the carbon material negative electrode active material is 40 to 95% by weight. Furthermore, the total content thereof is 80 to 98% by weight.

Incidentally, the mixing ratio of Si material and carbon material as a negative electrode active material is not particularly limited as long as it satisfies the content requirement described above, and it can be suitably selected depending on desired use or the like. In particular, the content of Si material in the negative electrode active material is preferably 3 to 40% by weight. According to one embodiment, the content of Si material in the negative electrode active material is more preferably 4 to 30% by weight. According to another embodiment, the content of Si material in the negative electrode active material is more preferably 5 to 20% by weight.

When the content of the Si material is 3% by weight or more, high initial capacity is obtained, and therefore desirable. On the other hand, when the content of the Si material is 40% by weight or less, high cycle property is obtained, and therefore desirable.

According to this embodiment, the negative electrode active material layer preferably contains a binder and a conductive aid in addition to the negative electrode active material which is described above. In addition, if necessary, it further contains other additives including an electrolyte (for example, polymer matrix, ion conductive polymer, and electrolyte solution) and lithium salt for increasing ion conductivity. As for the specific type or preferred content of those additives in the negative electrode active material layer, those descriptions given in the above for describing the positive electrode active material layer can be similarly adopted, and thus detailed descriptions are omitted herein.

The thickness of each active material layer (active material layer on a single surface of a current collector) is not particularly limited either, and reference can be made to the already-known knowledge about a battery. For example, the thickness of each active material layer is generally about 1 to 500 μm, and preferably from 2 to 100 μm, considering the purpose of use (for example, focused on output or focused on energy, etc.), ion conductivity, or the like of a battery.

<Current Collector>

The current collector (11, 12) is made of an electrically conductive material. The size of the respective current collector may be determined depending on the intended use of the battery. For example, a current collector having a large area is used for a large size battery for which high energy density is required.

The thickness of the current collector is not particularly limited, either. The thickness of the current collector is generally about 1 to 100 μm.

The shape of the respective current collector is not particularly limited, either. The laminate type battery 10 shown in FIG. 1 may use, in addition to a current collecting foil, a mesh-shaped current collector (such as an expanded grid) or the like.

Meanwhile, a current collecting foil is preferably used when a thin film alloy as the negative electrode active material is directly formed on the negative electrode current collector 12 by a sputtering method.

The material forming the current collector is not particularly limited. For example, a metal or resin in which electrically conductive filler is added to an electrically conductive polymer material or a non-electrically conductive polymer material may be used.

Specific examples of the metal include aluminum, nickel, iron, stainless steel, titanium and copper. In addition, a clad metal of nickel and aluminum, a clad metal of copper and aluminum, or an alloyed material of these metals combined together, may be preferably used. A foil in which a metal surface is covered with aluminum may also be used. In particular, aluminum, stainless steel, copper and nickel are preferable in view of electron conductivity, battery action potential, and adhesion of the negative electrode active material to a current collector by sputtering.

Examples of the electrically conductive polymer material include polyaniline, polypyrrole, polythiophene, polyacetylene, polyparaphenylene, polyphenylene vinylene, polyacrylonitrile, and polyoxadiazole. These electrically conductive polymer materials have the advantage in simplification of the manufacturing process and lightness of the current collector, as they have sufficient electric conductivity even if an electrically conductive filler is not added thereto.

Examples of the non-electrically conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). These non-electrically conductive polymer materials have high potential resistance or solvent resistance.

The above electrically conductive polymer material or the non-electrically conductive polymer material may include electrically conductive filler that is added as necessary. In particular, when the resin serving as a substrate of the current collector consists only of a non-electrically conductive polymer, the electrically conductive filler is essential to impart electric conductivity to the resin.

The electrically conductive filler is not particularly limited as long as it is a substance having electric conductivity. Examples of the material having high electric conductivity, potential resistance or lithium ion insulation characteristics, include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. The electrically conductive carbon is not particularly limited; however, the electrically conductive carbon is preferably at least one material selected from the group consisting of acetylene black, Vulcan, Black Pearl, carbon nanofiber, Ketjen black, carbon nanotube, carbon nanohorn, carbon nanoballoon, and fullerene.

The addition amount of the conductive filler is not particularly limited as long as sufficient conductivity can be imparted to the current collector. In general, the addition amount is about from 5 to 35% by weight.

(Area Ratio Between Active Material Layers)

In the electrical device according to the present embodiment, formula (1): $0.91 \leq C/A < 1$ is essentially satisfied, and $0.95 \leq C/A \leq 0.99$ is preferably satisfied in one or more unit cell layers constituting the above power generating element when the area of the negative electrode active material layer is A [m$^2$] and the area of the positive electrode active material layer is C [m$^2$].

Conventionally, in general, in an electrical device such as a lithium ion secondary battery, a negative electrode active material layer is designed so as to have a slightly larger size in order to suppress a defect such as generation of lithium dendrite in a negative electrode or facing misalignment between positive and negative electrodes to improve performance of the device. The studies by the present inventors have found that, according to the design conventionally performed in this way, cycle durability is deteriorated by use of a silicon-containing negative electrode active material because the size of a negative electrode active material layer is relatively larger than the size of a positive electrode active material layer. This is caused by a large irreversible capacity of the silicon-containing negative electrode active material. Specifically, when charge and discharge are performed using a silicon-containing negative electrode active material having a large irreversible capacity, Li occluded by a region facing a positive electrode active material layer in a negative electrode active material layer (positive electrode facing region) may be diffused into a region not facing the positive electrode active material layer (positive electrode non-facing region) during charging, and an irreversible change may occur. Such an irreversible change means that Li is consumed by the irreversible capacity in the positive electrode non-facing region which originally does not contribute to the charge and discharge capacity. Therefore, it has been found that the battery capacity capable of being extracted is finally reduced even by use of the silicon-containing negative electrode active material potentially having a large electric capacity.

Meanwhile, by controlling the value of C/A as in the present embodiment, an irreversible change due to movement of Li occluded by a negative electrode active material layer during charging from a positive electrode facing region to a positive electrode non-facing region in the negative electrode active material layer is suppressed. As a result, reduction in battery capacity in accordance with repeated charge and discharge cycles is prevented, and an electrical device having excellent cycle durability is provided. The effect of improving cycle durability is significantly exhibited particularly in a case of using a negative electrode active material having a large irreversible capacity due to such a suppression of the irreversible change. Therefore, the present invention essentially uses a silicon-containing negative electrode active material having a large irreversible capacity.

In addition, as a more preferable embodiment, it has been found that there are suitable requirements in a case where a unit cell layer satisfying formula (1) defining the C/A ratio is formed of a combination of a positive electrode and a negative electrode each having a relatively large irreversible capacity. That is, originally, the irreversible capacity of a negative electrode active material is much larger than that of a positive electrode. In a case where a positive electrode active material having a large irreversible capacity (for example, solid solution positive electrode active material) is used, when the irreversible capacity per unit area of a negative electrode active material layer is $I_A$ and the irreversible capacity per unit area of a positive electrode active material layer is $I_C$, it can be defined that "$I_C/I_A \geq 0.40$ is satisfied". In such a case, the C/A ratio preferably satisfies $0.91 \leq C/A < 0.99$, and more preferably satisfies $0.95 \leq C/A < 0.99$. In this way, when a material having a relatively large irreversible capacity is used as the positive electrode active material, by setting an upper limit value of C/A to a smaller value, there is such an advantage that cycle durability can be further improved. This is considered to be due to capability of suppressing a battery defect caused by electrodeposition or facing misalignment more effectively.

<Separator (Electrolyte Layer)>

In the present embodiment, a separator has a function of maintaining an electrolytic solution (liquid electrolyte) to ensure lithium ion conductivity between a positive electrode and a negative electrode and a function of a partition wall between a positive electrode and a negative electrode.

Examples of a form of separator include a porous sheet separator or a non-woven separator formed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylidene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Furthermore, the volume density of a non-woven fabric is not particularly limited as long as sufficient battery characteristics are obtained with an impregnated electrolyte. Furthermore, it is sufficient that the thickness of the non-woven separator is the same as that of an electrolyte layer. Preferably, it is 5 to 200 μm. Particularly preferably, it is 10 to 100 μm.

As described above, the separator also contains an electrolytic solution (liquid electrolyte). The liquid electrolyte has an activity of a lithium ion carrier, and the liquid electrolyte has a form in which lithium salt as a supporting salt is dissolved in an organic solvent. Examples of the organic solvent which can be used include carbonates such as ethylene carbonate (EC), propylene carbonate (PC), dimethyl carbonate (DMC), diethyl carbonate (DEC), and ethyl methyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used.

In the present embodiment, the electrolytic solution (liquid electrolyte) preferably contains an additive. Specifically, the electrolytic solution preferably contains 1,5,2,4-dioxadithiane-2,2,4,4-tetraoxide (DDTO) and lithium difluorophosphate ($LiPO_2F_2$). The concentration of each of DDTO and $LiPO_2F_2$ in the electrolytic solution is not particularly limited. However, the concentration of DDTO in the electrolytic solution is preferably from 0.5 to 2.5% by weight, and more preferably from 1.0 to 2.0% by weight. The concentration of $LiPO_2F_2$ in the electrolytic solution is preferably from 1.8 to 3.0% by weight, and more preferably from 1.8 to 2.5% by weight.

The electrolytic solution (liquid electrolyte) may further contain an additive in addition to the components that are described above. Specific examples of the additive include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, l-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those additives may be used either singly or in combination of two or more types.

Furthermore, as a separator, a separator laminated with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing an impaired performance as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

Content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer is increased so that vibration resistance of a separator can be enhanced. On the other hand, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<Current Collecting Plate (Tab)>

In the lithium ion secondary battery, a current collecting plate (tab) that is electrically connected to the current collector is taken out of the laminate film as an outer casing material for the purpose of drawing the current to the outside of the battery.

The material constituting the current collecting plate is not particularly limited and a known highly electrical conducting material which is used in the related art as a current collecting plate for lithium ion secondary battery may be used. Preferred examples of the constituent material of the current collecting plate may include a metal material such as aluminum, copper, titanium, nickel, stainless steel (SUS) and an alloy thereof. The material is more preferably aluminum and copper and particularly preferably aluminum from the viewpoint of lightweight, corrosion resistance and high electrical conductivity. Meanwhile, the same material or different materials may be used in the positive electrode current collecting plate (positive electrode tab) and the negative electrode current collecting plate (negative electrode tab).

Figure 2:
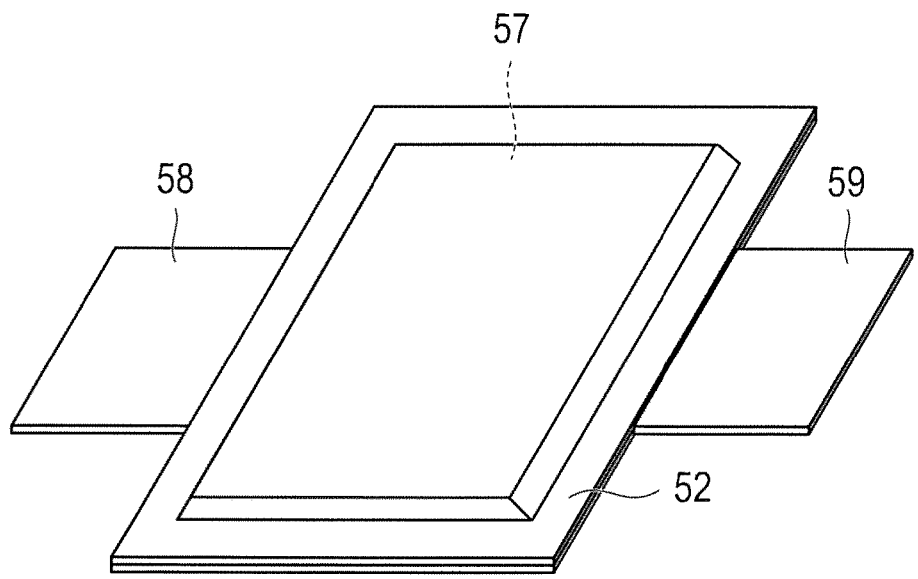
FIG. 2 is a perspective view illustrating an appearance of a flat lithium ion secondary battery, which is a typical embodiment of the electrical device according to the present invention.

The exposed state of the tabs 58 and 59 shown in FIG. 2 is not particularly limited. The positive electrode tab 58 and the negative electrode tab 59 may be taken out from the same side. Alternatively, the positive electrode tab 58 and the negative electrode tab 59 may each be divided into several pieces to be taken out separately from each side. Thus, the current collecting plates are not limited to the configuration shown in FIG. 2. In the wound lithium ion battery, a terminal may be formed by use of, for example, a cylinder can (metal can) in place of the tab.

<Seal Portion>

The seal portion is a unique member for the series laminate type battery and has a function to prevent the leakage of electrolyte layer. Furthermore, it is also possible to prevent the contact between adjacent current collectors in the battery or the short circuit caused by slight lack of uniformity of the ends of the laminated electrodes.

The constituting material for the seal portion is not particularly limited and a polyolefin resin such as polyethylene and polypropylene, an epoxy resin, rubber, polyimide and the like may be used. Among these, it is preferable to use a polyolefin resin from the viewpoint of corrosion resistance, chemical resistance, film forming property, economic efficiency and the like.

<Positive Electrode Terminal Lead and Negative Electrode Terminal Lead>

A known lead used in a laminate type secondary battery can be used as the material of the negative electrode and positive electrode terminal leads. Meanwhile, it is preferable to cover the part taken out from the outer casing material for battery with a thermal shrinkable tube exhibiting heat resistance and insulation so as not to affect the product (for example, automobile parts and especially electronic devices) by contact with a peripheral device or a wire causing the leakage of electricity.

<Outer Casing Material; Laminate Film>

As the outer casing material, it is possible to use a metal can case known in the related art. In addition, it is also possible to pack the power generating element 21 using the laminate film 29 illustrated in FIG. 1 as the outer casing material. The laminate film may be configured as a three-layer structure formed by laminating, for example, polypropylene, aluminum and nylon in this order. The use of such a laminate film makes it possible to easily perform opening of the outer casing material, addition of a capacity recovery material, and resealing of the outer casing material.

<Method for Producing Lithium Ion Secondary Battery>

The method for producing a lithium ion secondary battery is not particularly limited, and it may be produced by a known method. Specifically, the method includes (1) fabrication of the electrodes, (2) fabrication of the single battery layer, (3) fabrication of the power generating element, and (4) production of the laminate type battery. Hereinafter, the method for producing a lithium ion secondary battery will be described by taking an example but is not limited thereto.

(1) Fabrication of Electrode (Positive Electrode and Negative Electrode)

The electrode (positive electrode or negative electrode) may be fabricated, for example, by preparing an active material slurry (positive electrode active material slurry or negative electrode active material slurry), coating the active material slurry on a current collector, and drying and then pressing the resultant. The active material slurry contains the active material (positive electrode active material or negative electrode active material) described above, a binder, a conductive aid, and a solvent.

The solvent is not particularly limited, and N-methyl-2-pyrrolidone (NMP), dimethyl formamide, dimethyl acetamide, methyl formamide, cyclohexane, hexane, water and the like may be used.

The method for coating the active material slurry on the current collector is not particularly limited, and examples thereof may include a screen printing method, a spray coating method, an electrostatic spray coating method, an ink jet method, and a doctor blade method.

The method for drying the coating film formed on the surface of the current collector is not particularly limited as long as at least a part of the solvent in the coating film is removed. Examples of the drying method may include heating. The drying conditions (drying time, drying temperature and the like) may be appropriately set depending on the volatilization rate of the solvent contained in the active material slurry to be applied, the coating amount of the active material slurry and the like. Incidentally, a part of the solvent may remain. The remained solvent may be removed in the pressing process or the like to be described below.

The pressing means is not particularly limited, and for example, a calendar roll, a flat press and the like may be used.

(2) Fabrication of Single Battery Layer

The single battery layer may be fabricated by laminating the electrodes (positive electrode and negative electrode) fabricated in (1) via an electrolyte layer.

(3) Fabrication of Power Generating Element

The power generating element may be fabricated by laminating the single battery layers in appropriate consideration of the output and capacity of the single battery layer, and the output, capacity and the like that are required for a battery.

(4) Production of Laminate Type Battery

As the configuration of the battery, it is possible to employ various kinds of shapes such as a square shape, a paper type, a laminate type, a cylindrical type and a coin type. In addition, the current collector, an insulating plate and the like of the constituent components are not particularly limited and may be selected according to the above shape. However, a laminate type cell is preferred in this embodiment. In the laminate type battery, the lead is joined to the current collector of the power generating element obtained above and this positive electrode lead or negative electrode lead is joined to the positive electrode tab or the negative electrode tab. Thereafter, the power generating element is introduced into the laminate sheet such that the positive electrode tab and the negative electrode tab are exposed to the outside of the battery, the electrolyte solution is injected by a injecting machine, and the laminate sheet is sealed in a vacuum, such that the laminate type battery can be produced.

(5) Activation Treatment or the Like

In the present embodiment, it is preferable to further perform an initial charge treatment, a gas removing treatment, and an activation treatment under the following conditions from a viewpoint of improving performance and durability of the laminate type battery obtained above (refer to Example 1). In this case, in order to be able to perform the gas removing treatment, in the above (4) Production of laminate type battery, three sides of the laminate sheet (outer casing material) are completely sealed (main sealing) at the time of sealing by thermocompression bonding into a rectangular shape, and the remaining one side is temporarily sealed by thermocompression bonding. The remaining one side, for example, may be freely opened or closed by clipping or the like. However, it is preferable to temporarily seal the one side by thermocompression bonding from the viewpoint of mass production (production efficiency). This is because this case only requires adjusting the temperature and the pressure for bonding. When the side is temporarily sealed by thermocompression bonding, the side can be unsealed by applying a slight pressure. After degassing, the side may be temporarily sealed again by thermocompression bonding. Finally, the side can be completely sealed (main sealing) by thermocompression bonding.

(Initial Charge Treatment)

For example, when a solid solution positive electrode active material is used, an aging treatment of a battery is preferably performed as follows. A battery is charged at 25° C. at 0.05 C for four hours (SOC about 20%) by a constant current charging method, and is allowed to stand in the state about for one day. Subsequently, the battery is charged at 25° C. at 0.1 C rate to 4.45 V. Thereafter, charging is stopped, and the battery is allowed to stand in the state (SOC about 70%) about for one day and then is discharged at 0.1 C to 2.0 V. The battery is allowed to stand in the state for one hour and then is discharged at 0.05 C to 2.0 V.

(Initial (First) Gas Removing Treatment)

Next, as the initial (first) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform temporary sealing. In addition, pressure molding (contact pressure: 0.5±0.1 MPa) is performed using a roller to make the electrode adhere to the separator sufficiently.

(Activation Treatment)

Subsequently, when a solid solution positive electrode active material is used, for example, the following electrochemical pretreatment method is performed as an activation treatment method.

One cycle is performed as follows. The battery is charged at 25° C. at 0.1 C until the voltage becomes 4.45 V by a constant current charging method, then is allowed to stand in the state for one day, then is discharged at 0.1 C to 2.0 V, then is allowed to stand for one hour, and then is discharged at 0.05 C to 2.0 V. Similarly, one cycle is performed as follows. The battery is charged at 25° C. at 0.1 C until the voltage becomes 4.55 V by a constant current charging method, then is allowed to stand in the state for one day, then is discharged at 0.1 C to 2.0 V, then is allowed to stand for one hour, and then is discharged at 0.05 C to 2.0 V. Similarly, one cycle is performed as follows. The battery is charged at 0.1 C until the voltage becomes 4.65 V, then is allowed to stand in the state for one day, then is discharged at 0.1 C to 2.0 V, then is allowed to stand for one hour, and one cycle of discharging at 0.05 C to 2.0 V is performed. Furthermore, the battery is charged at 25° C. at 0.1 C until the voltage becomes 4.75 V by a constant current charging method, then is allowed to stand in the state for one day, then is discharged at 0.1 C to 2.0 V, then is allowed to stand for one hour, and then is discharged at 0.05 C to 2.0 V.

Here, as the activation treatment method, an electrochemical pretreatment method in which the constant current charging method is used and the voltage is used as a stop condition has been described as an example. However, as the charging method, a constant current constant voltage charging method may be used. In addition to the voltage, a charge amount or time may be employed as the stop condition.

(Last (Second) Gas Removing Treatment)

Next, as the last (second) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform main sealing. In addition, pressure molding (contact pressure: 0.5±0.1 MPa) is performed using a roller to make the electrode adhere to the separator sufficiently.

In the present embodiment, it is possible to enhance performance and durability of the obtained battery by performing the above-described initial charge treatment, gas removing treatment, and activation treatment.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small size assembled battery by connecting plural batteries in series or in parallel. Furthermore, by connecting again plural detachable small size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small size assembled battery for fabricating an assembled battery with high capacity can be determined depending on the capacity or output of a battery of a vehicle (electric vehicle) for which the battery is loaded.

[Vehicle]

The lithium ion secondary battery according to the present embodiment can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the lithium ion secondary battery (electrical device) can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinbelow, more detailed descriptions are given in view of Examples and Comparative Examples, but the present invention is not limited to the Examples given below.

Comparative Example 1

(Preparation of Solid Solution Positive Electrode Active Material C1)

1. To 200 g of pure water, 28.61 g of manganese sulfate monohydrate (molecular weight 223.06 g/mol) and 17.74 g of nickel sulfate hexahydrate (molecular weight 262.85 g/mol) were added. The resulting mixture was stirred and dissolved to prepare a mixed solution.

2. Subsequently, ammonia water was dropwise added to the mixed solution until the pH became 7. A $Na_2CO_3$ solution was further dropwise added thereto, and a composite carbonate was precipitated (the PH was maintained to 7 with ammonia water while the $Na_2CO_3$ solution was dropwise added).

3. Thereafter, the precipitate was subjected to suction filtration, was washed with water sufficiently, and then was dried at 120° C. for five hours in a dry oven.

4. The dry powder was pulverized with a mortar, and then was subjected to temporary calcination at 500° C. for five hours.

5. With the powder subjected to temporary calcination, 10.67 g of lithium hydroxide monohydrate (molecular weight 41.96 g/mol) was mixed. The resulting mixture was pulverized and mixed for 30 minutes.

6. This powder was subjected to temporary calcination at 500° C. for two hours. Thereafter, the powder was subjected to calcination at 900° C. for 12 hours to obtain a solid solution positive electrode active material C1.

The composition of the solid solution positive electrode active material C1 obtained in this way was as follows.

Composition: C1 $Li_{1.5}[Ni_{0.45}Mn_{0.85}[Li]_{0.20}]O_3$

When the composition of the solid solution positive electrode active material C1 is applied to formula (3), a+b+c+d=1.5, d=0.20, a+b+c=1.3, and z represents the number of oxygen atoms satisfying a valence, meeting the requirement of formula (3).

(Fabrication of Positive Electrode C1 Having Positive Electrode Active Material Layer Formed on Single Surface of Current Collector)

(Composition of Slurry for Positive Electrode)

The slurry for positive electrode had the following composition.

Positive electrode active material: Solid solution positive electrode active material C1 obtained from above 9.4 parts by weight Conductive aid: Flaky graphite 0.15 part by weight
Acetylene black 0.15 part by weight
Binder: Polyvinylidene fluoride (PVDF) 0.3 part by weight
Solvent: N-methyl-2-pyrrolidone (NMP) 8.2 parts by weight.

When the above composition is applied to the formula (2), e=94 is obtained, and thus the requirement of the formula (2) is satisfied.

(Preparation of slurry for positive electrode) The slurry for a positive electrode having the above-described composition was prepared as follows. First, 2.0 parts by weight of a 20% binder solution in which a binder is dissolved in a solvent (NMP) and 4.0 parts by weight of the solvent (NMP) were added to a 50 ml disposable cup. The resulting mixture was stirred with a stirring deaerator (rotating and revolving mixer: Awatori Rentaro AR-100) for one minute to prepare a binder diluted solution. Subsequently, 0.4 part by weight of a conductive aid, 9.2 parts by weight of solid solution positive electrode active material C1, and 2.6 parts by weight of the solvent (NMP) were added to this binder diluted solution. The resulting mixture was stirred for 3 minutes using the stirring deaerator to obtain a slurry for a positive electrode (solid concentration: 55% by weight).

(Coating•Drying of Slurry for Positive Electrode)

One surface of aluminum current collector having a thickness of 20 m was coated with the slurry for a positive electrode using an automatic coating device (doctor blade: PI-1210 automatic coating apparatus manufactured by Tester Sangyo Co., Ltd.). Subsequently, this current collector coated with the slurry for a positive electrode was dried using a hot plate (100° C. to 110° C., drying time: 30 minutes) to form a sheet-like positive electrode having a remaining NMP amount of 0.02% by weight or less in the positive electrode active material layer.

(Press of Positive Electrode)

The above sheet-like positive electrode was subjected to compression molding by applying a roller press, and cut to manufacture positive electrode having a density of 2.65 g/cm³.

(Drying of Positive Electrode)

Subsequently, the positive electrode which was prepared according to the above procedures was dried in a vacuum drying furnace. The positive electrode was disposed in the drying furnace, and then the pressure was reduced (100 mmHg (1.33×10⁴ Pa)) at room temperature (25° C.) to remove the air in the drying furnace. Subsequently, the temperature was raised to 120° C. at 10° C./min while nitrogen gas was circulated (100 cm³/min), and the pressure was reduced again at 120° C. The positive electrode was allowed to stand for 12 hours while nitrogen in the furnace was discharged, and then the temperature was lowered to room temperature. Positive electrode C1 from the surface of which water had been removed was obtained in this way.

(Preparation of Negative Electrode A1 in which Active Material Layer is Formed on One Surface of Current Collecting Foil)

(Composition of Slurry for Negative Electrode)

The slurry for a negative electrode had the following composition.

Negative electrode active material: 1.00 part by weight of $SiO_x$ (manufactured by Kusaka rare metal Co., Ltd., x=1) and 8.45 parts by weight of carbon material (graphite manufactured by Hitachi Chemical Co., Ltd.)
Conductive aid: 0.20 parts by weight of SuperP
Binder: 0.35 parts by weight of polyvinylidene fluoride (PVDF)
Solvent: 10.0 parts by weight of N-methyl-2-pyrrolidone (NMP)

When this composition is applied to formula (4), α+β=94.5, α=10, and β=84.5, meeting the requirement of formula (4). The average particle diameter of the carbon material was 24 μm. The average particle diameter of $SiO_x$ particles was 0.5 μm.

(Manufacturing Slurry for Negative Electrode)

The slurry for a negative electrode having the above composition was prepared as follows. First, 5 parts by weight of a solvent (NMP) was added to 1.75 parts by weight of a 20% binder solution in which a binder was dissolved in the solvent (NMP). The resulting mixture was stirred with a stirring deaerator for one minute to manufacture a binder diluted solution. To this binder diluted solution, 0.2 parts by weight of a conductive aid, 9.45 parts by weight of negative electrode active material powder, and 3.6 parts by weight of the solvent (NMP) were added. The resulting mixture was stirred for three minutes using the stirring deaerator to obtain a slurry for a negative electrode (solid concentration 50% by weight).

(Coating·Drying of Slurry for Negative Electrode)

One surface of electrolytic copper current collector having a thickness of 10 m was coated with the slurry for a negative electrode using an automatic coating device. Subsequently, this current collector coated with the slurry for a negative electrode was dried using a hot plate (100° C. to 110° C., drying time: 30 minutes) to form a sheet-like negative electrode having a remaining NMP amount of 0.02% by weight or less in the negative electrode active material layer.

(Press of Negative Electrode)

The obtained sheet-like negative electrode was subjected to compression molding by applying a roller press, and cut to manufacture negative electrode having a weight of one surface of the negative electrode active material layer of about 8.54 mg/cm² and a density of 1.45 g/cm³. When the surface of negative electrode was observed, an occurrence of crack was not observed.

(Drying Electrode)

Subsequently, the negative electrode manufactured by the above procedure was dried in a vacuum drying furnace. The negative electrode was disposed in a drying furnace, and then the pressure was reduced (100 mmHg (1.33×10⁴ Pa)) at room temperature (25° C.) to remove the air in the drying furnace. Subsequently, the temperature was raised to 135° C. at 10° C./min while nitrogen gas was circulated (100 cm³/min), and the pressure was reduced again at 135° C. The negative electrode was allowed to stand for 12 hours while nitrogen in the furnace was discharged, and then the temperature was lowered to room temperature. Water on a surface of the negative electrode was removed in this way to obtain a negative electrode A1.

[Fabrication of Laminate Cell]

Positive electrode C1 obtained above was cut so as to have an active material layer area with length 2.5 cm×width 2.0 cm. Uncoated surfaces (surfaces of aluminum current collecting foil, not coated with slurry) of these two pieces were stuck to each other such that the current collectors thereof face each other, and the current collector part was subjected to spot welding. A positive electrode having positive electrode active material layers, which are formed on both surfaces of the two-layered current collecting foil integrated by spot welding in the outer periphery thereof, was thereby formed. Thereafter, a positive electrode tab (positive electrode current collecting plate) of aluminum was welded to the current collector part to form positive electrode C11. That is, positive electrode C11 has the active material layers formed on both surfaces of the current collecting foil.

Meanwhile, the negative electrode A1 obtained above was cut so as to have an active material layer area with length 2.7 cm×width 2.2 cm. Thereafter, a negative electrode tab of electrolytic copper was welded to the current collector part to form negative electrode A11. That is, the negative electrode A11 has the active material layer formed on one surface of the current collector.

A five-layered laminate type power generating element was manufactured by sandwiching a separator (S) made of porous polypropylene (length 3.0 cm×width 2.5 cm, thickness 25 m, porosity 55%) between these negative electrode A11 and positive electrode C11 to which tabs had been welded. The laminate type power generating element had a structure of negative electrode (one surface)/separator/positive electrode (both surfaces)/separator/negative electrode (one surface), that is, a structure in which A11-(S)-C11-(S)-A11 were laminated in this order. Subsequently, both sides thereof were sandwiched by a laminate film outer casing made of aluminum (length 3.5 cm×width 3.5 cm). Three sides thereof were sealed by thermocompression bonding to house the power generating element. Into this power generating element, 0.8 cm³ (the above five-layered structure has a two-cell structure and an injection amount per cell was 0.4 cm³) of an electrolyte solution was injected. Thereafter, the remaining one side was temporarily sealed by thermocompression bonding to manufacture a laminate type battery. In order to make the electrolyte solution go inside electrode pores sufficiently, the laminate type battery was allowed to stand at 25° C. for 24 hours while a contact pressure of 0.5 MPa was applied thereto.

Incidentally, the following material was used for preparing the electrolyte solution. First, 1.0 M of $LiPF_6$ (electrolyte) was dissolved in a mixed solvent of 30% by volume of ethylene carbonate (EC) and 70% by volume of diethyl carbonate (DEC). Thereafter, 1.8% by weight of lithium difluorophosphate ($LiPO_2F_2$) as lithium fluorophosphate acting as an additive was used as an electrolyte solution.

Comparative Example 2

A battery was manufactured in a similar manner to the above Comparative Example 1 except that the area of the active material layer of the negative electrode A1 was vertical 2.65 cm×horizontal 2.2 cm.

Example 1

A battery was manufactured in a similar manner to the above Comparative Example 1 except that the area of the active material layer of the negative electrode A1 was vertical 2.6 cm×horizontal 2.1 cm.

Example 2

A battery was manufactured in a similar manner to the above Comparative Example 1 except that the area of the active material layer of the negative electrode A1 was vertical 2.55 cm×horizontal 2.05 cm.

Example 3

A battery was manufactured in a similar manner to the above Comparative Example 1 except that the area of the active material layer of the negative electrode A1 was vertical 2.525 cm×horizontal 2.02 cm.

Comparative Example 3

A battery was manufactured in a similar manner to the above Comparative Example 1 except that the area of the active material layer of the negative electrode A1 was vertical 2.5 cm×horizontal 2.0 cm.

Comparative Example 4

A battery was manufactured in a similar manner to the above Comparative Example 1 except that a Si-containing alloy $Si_{42}Ti_7Sn_{51}$ was used in place of $SiO_x$ as the Si material used for preparation of the slurry for a negative electrode. Here, the negative electrode manufactured in this Comparative Example is referred to as a negative electrode A2. The Si-containing alloy was manufactured by a mechanical alloying method. Specifically, zirconia pulverizing balls and raw material powders for an alloy were put into a zirconia pulverizing pot, and were alloyed at 600 rpm for 48 hours using a planetary ball mill apparatus P-6 manufactured by German Fritsch Co., Ltd.

The Si-containing alloy prepared above ($Si_{42}Ti_7Sn_{51}$) has similar characteristics to another alloy which can be used in the present invention (an alloy other than $Si_{42}Ti_7Sn_{51}$ among $Si_xTi_yGe_zA_a$, $Si_xTi_yZn_zA_a$, and $Si_xTi_ySn_zA$). Therefore, the alloy which can be used in the present invention brings about the same result as the experimental example using $Si_{42}Ti_7Sn_{51}$ or a similar result thereto.

Example 4

A battery was manufactured in a similar manner to the above Comparative Example 4 except that the area of the active material layer of the negative electrode A2 was vertical 2.55 cm×horizontal 2.05 cm.

Comparative Example 5

A battery was manufactured in a similar manner to the above Comparative Example 4 except that $Si_{34}Sn_{21}C_{45}$ was used in place of $Si_{42}Ti_7Sn_{51}$ as the Si material (Si-containing alloy) used for preparation of the slurry for a negative electrode. Here, the negative electrode manufactured in this Comparative Example is referred to as a negative electrode A3.

The Si-containing alloy prepared above ($Si_{34}Sn_{21}C_{45}$) has similar characteristics to another alloy which can be used in the present invention (an alloy other than $Si_{34}Sn_{21}C_{45}$ among $Si_xSn_yAl_zA_a$, $Si_xSn_yV_zA_a$, and $Si_xSn_yC_zA$). Therefore, the alloy which can be used in the present invention brings about the same result as the experimental example using $Si_{34}Sn_{21}C_{45}$ or a similar result thereto.

Example 5

A battery was manufactured in a similar manner to the above Comparative Example 5 except that the area of the active material layer of the negative electrode A3 was vertical 2.55 cm×horizontal 2.05 cm.

Comparative Example 6

A battery was manufactured in a similar manner to the above Comparative Example 1 except that $LiCoO_2$ was used in place of the solid solution positive electrode active material C1 as the positive electrode active material used for preparation of the slurry for a positive electrode. Here, the positive electrode manufactured in this Comparative Example is referred to as a positive electrode C2.

Example 6

A battery was manufactured in a similar manner to the above Comparative Example 6 except that the area of the active material layer of the negative electrode A1 was vertical 2.6 cm×horizontal 2.1 cm.

Example 7

A battery was manufactured in a similar manner to the above Comparative Example 6 except that the area of the active material layer of the negative electrode A1 was vertical 2.55 cm×horizontal 2.05 cm.

Example 8

A battery was manufactured in a similar manner to the above Comparative Example 6 except that the area of the active material layer of the negative electrode A1 was vertical 2.525 cm×horizontal 2.02 cm.

Comparative Example 7

A battery was manufactured in a similar manner to the above Comparative Example 6 except that the area of the active material layer of the negative electrode A1 was vertical 2.5 cm×horizontal 2.0 cm.

Thereafter, the power generating element of each battery obtained from the above was set at a jig provided with an evaluation cell, and a positive electrode lead and a negative electrode lead were attached to each tab end of the power generating element. A test was then performed.

[Evaluation 1 of Battery Characteristics]

Performance of the laminate type battery manufactured above was evaluated. At this time, for the batteries of Comparative Examples 1 to 5 and Examples 1 to 5 using the positive electrode C1 containing a solid solution positive electrode active material, an initial charge treatment and an activation treatment were performed under the following conditions, and then the battery capacity was checked and the cycle durability was evaluated.

[Initial Charge Treatment]

An aging treatment of a battery was performed as follows. A battery was charged at 25° C. at 0.05 C for four hours (SOC about 20%) by a constant current charging method, and was allowed to stand in the state about for one day. Subsequently, the battery was charged at 25° C. at 0.1 C rate to 4.45 V. Thereafter, charging was stopped, and the battery was allowed to stand in the state (SOC about 70%) about for one day and then was discharged at 0.1 C to 2.0 V. The battery was allowed to stand in the state for one hour and then was discharged at 0.05 C to 2.0 V.

[Gas Removing Treatment 1]

The one side temporarily sealed by thermocompression bonding was unsealed. Gas was removed at 10±3 hPa for five minutes. Thereafter, the one side was subjected to thermocompression bonding again to perform temporary sealing. In addition, pressure molding (contact pressure 0.5±0.1 MPa) was performed using a roller to make the electrode adhere to the separator sufficiently.

[Activation Treatment]

One cycle was performed as follows. The battery was charged at 25° C. at 0.1 C until the voltage became 4.45 V by a constant current charging method, then was allowed to stand in the state for one day, then was discharged at 0.1 C to 2.0 V, then was allowed to stand for one hour, and then was discharged at 0.05 C to 2.0 V. Similarly, one cycle was performed as follows. The battery was charged at 25° C. at 0.1 C until the voltage became 4.55 V by a constant current charging method, then was allowed to stand in the state for one day, then was discharged at 0.1 C to 2.0 V, then was allowed to stand for one hour, and then was discharged at 0.05 C to 2.0 V. Similarly, one cycle was performed as follows. The battery was charged at 0.1 C until the voltage became 4.65 V, then was allowed to stand in the state for one day, then was discharged at 0.1 C to 2.0 V, then was allowed to stand for one hour, and then was discharged at 0.05 C to 2.0 V. Furthermore, one cycle was performed as follows. The battery was charged at 25° C. at 0.1 C until the voltage became 4.75 V by a constant current charging method, then was allowed to stand in the state for one day, then was discharged at 0.1 C to 2.0 V, then was allowed to stand for one hour, and then was discharged at 0.05 C to 2.0 V.

[Gas Removing Treatment 2]

The one side temporarily sealed by thermocompression bonding was unsealed. Gas was removed at 10±3 hPa for five minutes. Thereafter, the one side was subjected to thermocompression bonding again to perform regular sealing. In addition, pressure molding (contact pressure: 0.5±0.1 MPa) was performed using a roller to make the electrode adhere to the separator sufficiently.

[Check of Battery Capacity]

Each battery was subjected to a charge and discharge test, and the battery capacity thereof was examined. That is, under an atmosphere of 30° C., a battery was charged by a constant current and constant voltage charge method at a current density equivalent to 0.1 C at an upper limit voltage of 4.45 V, was allowed to rest for one minute, and then was discharged at a current density equivalent to 0.1 C to 2 V by a constant current discharge method. This charge and discharge cycle was repeated three times, and the discharge capacity at the third cycle was defined as a battery capacity. The results are shown in Table 1 below. As for the values of "battery capacity" shown in Table 1, values for Comparative Examples 1 to 3 and Examples 1 to 3 are relative values when the battery capacity in Comparative Example 3 is assumed to be 100%, values for Comparative Example 4 and Example 4 are relative values when the battery capacity in Example 4 is assumed to be 100%, and values for Comparative Example 5 and Example 5 are relative values when the battery capacity in Example 5 is assumed to be 100%.

[Test for Cycle Durability]

Each battery was subjected to a charge and discharge cycle test, and the discharge capacity retention ratio thereof was examined. That is, under an atmosphere of 30° C., a battery was charged by a constant current and constant voltage charge method at a current density equivalent to 1 C at an upper limit voltage of 4.45 V, was allowed to rest for one minute, and then was discharged at a current density equivalent to 1 C to 2 V by a constant current discharge method. This charge and discharge cycle was repeated one hundred times. A ratio of the discharge capacity at the 100-th cycle with respect to the discharge capacity at the first cycle was evaluated as "capacity retention ratio (%)". The results are shown in Table 1 below.

Capacity retention ratio (%)=discharge capacity at the 100-th cycle/discharge capacity at the first cycle×100

[Evaluation 2 of Battery Characteristics]

Meanwhile, for the batteries of Comparative Examples 6 and 7 and Examples 6 to 8 using the positive electrode C2 containing $LiCoO_2$ as a positive electrode active material, an initial charge treatment and an activation treatment were performed under the following conditions, and then the battery capacity was checked and the cycle durability was evaluated.

[Initial Charge Treatment 1]

An aging treatment of a battery was performed as follows. A battery was charged at 25° C. at 0.05 C for four hours (SOC about 20%) by a constant current charging method, and was allowed to stand in the state about for one day. Subsequently, the battery was charged at 25° C. at 0.1 C rate to 4.2 V. Thereafter, charging was stopped, and the battery was allowed to stand in the state (SOC about 70%) about for one day and then was discharged at 0.1 C to 2.5 V. The battery was allowed to stand in the state for one hour and then was discharged at 0.05 C to 2.5 V.

[Gas Removing Treatment 1]

The one side temporarily sealed by thermocompression bonding was unsealed. Gas was removed at 10±3 hPa for five minutes. Thereafter, the one side was subjected to thermocompression bonding again to perform temporary sealing. In addition, pressure shaping (contact pressure 0.5±0.1 MPa) was performed using a roller to make the electrode adhere to the separator sufficiently.

[Activation Treatment]

One cycle was performed as follows. The battery was charged at 25° C. at 0.1 C until the voltage became 4.2 V by a constant current charging method, then was allowed to stand in the state for one day, then was discharged at 0.1 C to 2.5 V, then was allowed to stand for one hour, and then was discharged at 0.05 C to 2.5 V.

[Gas Removing Treatment 2]

The one side temporarily sealed by thermocompression bonding was unsealed. Gas was removed at 10±3 hPa for five minutes. Thereafter, the one side was subjected to thermocompression bonding again to perform regular sealing. In addition, pressure shaping (contact pressure 0.5±0.1 MPa) was performed using a roller to make the electrode adhere to the separator sufficiently.

[Check of Battery Capacity]

Each battery was subjected to a charge and discharge test, and the battery capacity thereof was examined. That is, under an atmosphere of 30° C., a battery was charged by a constant current and constant voltage charge method at a current density equivalent to 0.1 C at an upper limit voltage of 4.2 V, was allowed to rest for one minute, and then was discharged at a current density equivalent to 0.1 C to 2.5 V by a constant current discharge method. This charge and discharge cycle was repeated three times, and the discharge capacity at the third cycle was defined as a battery capacity. The results are shown in Table 1 below. As for the values of "battery capacity" shown in Table 1, values for Comparative Examples 6 and 7 and Examples 6 to 8 are relative values when the battery capacity in Comparative Example 7 is assumed to be 100%.

[Test for Cycle Durability]

Each battery was subjected to a charge and discharge cycle test, and the discharge capacity retention ratio thereof was examined. That is, under an atmosphere of 30° C., a battery was charged by a constant current and constant voltage charge method at a current density equivalent to 1 C at an upper limit voltage of 4.2 V, was allowed to rest for one minute, and then was discharged at a current density equivalent to 1 C to 2.5 V by a constant current discharge method. This charge and discharge cycle was repeated one hundred times. A ratio of the discharge capacity at the 100-th cycle with respect to the discharge capacity at the first cycle was evaluated as "capacity retention ratio (%)". The results are shown in Table 1 below.

Capacity retention ratio (%)=discharge capacity at the 100-th cycle/discharge capacity at the first cycle×100

TABLE 1

| | positive electrode | negative electrode | area ratio between positive and negative electrodes C/A | $I_C/I_A$ | battery capacity | capacity retention ratio |
|---|---|---|---|---|---|---|
| Comparative Example 1 | C1 | A1 | 0.842 | 0.400 | 95% | 87% |
| Comparative Example 2 | C1 | A1 | 0.855 | 0.400 | 95% | 86% |
| Example 1 | C1 | A1 | 0.916 | 0.400 | 97% | 90% |
| Example 2 | C1 | A1 | 0.956 | 0.400 | 99% | 92% |
| Example 3 | C1 | A1 | 0.978 | 0.400 | 99% | 90% |
| Comparative Example 3 | C1 | A1 | 1.000 | 0.400 | 100% | 20% |
| Comparative Example 4 | C1 | A2 | 0.842 | 0.470 | 96% | 84% |
| Example 4 | C1 | A2 | 0.956 | 0.470 | 100% | 88% |
| Comparative Example 5 | C1 | A3 | 0.842 | 0.420 | 95% | 82% |
| Example 5 | C1 | A3 | 0.956 | 0.420 | 100% | 90% |
| Comparative Example 6 | C2 | A1 | 0.842 | 0.100 | 82% | 80% |
| Example 6 | C2 | A1 | 0.916 | 0.100 | 90% | 91% |
| Example 7 | C2 | A1 | 0.956 | 0.100 | 95% | 92% |
| Example 8 | C2 | A1 | 0.990 | 0.100 | 98% | 94% |
| Comparative Example 7 | C2 | A1 | 1.000 | 0.100 | 100% | 14% |

As clear from the results shown in Table 1, the lithium ion secondary batteries in Examples 1 to 8, which were the electrical devices according to the present invention, exhibited better cycle durability (capacity retention ratio at the 100-th cycle) than the batteries in Comparative Examples 1 to 7.

Specifically, from the results in Comparative Examples 1 to 3 and Examples 1 to 3, it has been found that a larger C/A value improves the battery capacity and a C/A value of 1 or less than 0.91 deteriorates cycle durability.

From the results in Comparative Examples 4 and 5 and Examples 4 and 5, it has been found that a suitable range of C/A similar to the above range is maintained even when a different kind of negative electrode is used.

Furthermore, from the results in Comparative Examples 6 and 7 and Examples 6 to 8, it has been found that a suitable range of C/A similar to a case of using a positive electrode active material having a large irreversible capacity such as a solid solution positive electrode active material is maintained even when a positive electrode active material having a small irreversible capacity is used. However, in order to increase the battery capacity in such a case, it is necessary to make the range larger than a case of using a solid solution positive electrode active material having a large irreversible capacity.

REFERENCE SIGNS LIST 10, 50 Lithium ion secondary battery
11 Negative electrode current collector
12 Positive electrode current collector
13 Negative electrode active material layer
15 Positive electrode active material layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. An electrical device which comprises a power generating element containing one or more unit cell layers,
at least one of the one or more unit cell layers containing:
a positive electrode in which a positive electrode active material layer containing a positive electrode active material is formed on a surface of a positive electrode current collector;
a negative electrode in which a negative electrode active material layer containing a silicon-containing negative electrode active material is formed on a surface of a negative electrode current collector; and
a separator,
wherein in the at least one of the one or more unit cell layers, the electrical device satisfies formula (1): 0.91≤C/A<0.99 where the area of the negative electrode active material layer is A [m²] and the area of the positive electrode active material layer is C [m²],
wherein the at least one unit cell layer has a unit cell layer satisfying the formula (1), and in the unit cell layer, the electrical device satisfies $I_C/I_A$≥0.40 where the irreversible capacity per unit area of the negative electrode active material layer of the unit cell layer is $I_A$ and the irreversible capacity per unit area of the positive electrode active material layer of the unit cell layer is $I_C$,
wherein the positive electrode active material contains a solid solution positive electrode active material that has as a basic structure a composition represented by the following formula (3):

[Mathematical formula 2]

$$Li_{1.5}[Ni_aMn_bCo_c[Li]_d]O_2 \qquad (3),$$

In the formula, z represents the number of oxygen atoms satisfying a valence, a+b+c+d=1.5, 0.1≤d≤0.4, and 1.1≤[a+b+c]≤1.4, and
wherein the negative electrode active material layer contains a negative electrode active material represented by the following formula (4):

[Mathematical formula (3)]

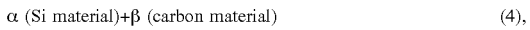

$$\alpha \text{ (Si material)} + \beta \text{ (carbon material)} \qquad (4),$$

In the formula, the Si material is formed of one or more kinds selected from the group consisting of Si-containing alloys, α and β each represent % by weight of each component in the negative electrode active material layer, and 80≤α+β≤98, 3≤α≤40, and 40≤β≤95.

2. The electrical device according to claim 1, wherein the electrical device is a lithium ion secondary battery.

3. The electrical device according to claim 1, wherein the electrical device satisfies 0.95≤C/A<0.99.

4. The electrical device according to claim 1, wherein the negative electrode active material represented by the formula (4) satisfies 5≤α≤20.

5. An electrical device which comprises a power generating element containing one or more unit cell layers containing:
a positive electrode in which a positive electrode active material layer containing a positive electrode active material is formed on the surface of a positive electrode current collector;
a negative electrode in which a negative electrode active material layer containing a silicon-containing negative electrode active material is formed on the surface of a negative electrode current collector; and a separator, wherein in the one or more unit cell layers constituting the power generating element, the electrical device satisfies formula (1): $0.91 \leq C/A < 1$ when the area of the negative electrode active material layer is A [m$^2$] and the area of the positive electrode active material layer is C [m$^2$], in the unit cell layer satisfying the formula (1), the positive electrode active material layer contains a positive electrode active material represented by the following formula (2):

[Mathematical formula 1]

$$e \text{ (solid solution positive electrode active material)} \quad (2),$$

In the formula, e represents % by weight of each component in the positive electrode active material layer and $80 \leq e \leq 98$, and the solid solution positive electrode active material has as a basic structure a composition represented by the following formula (3):

[Mathematical formula 2]

$$Li_{1.5}[Ni_a Mn_b Co_c [Li]_d]O_z \quad (3),$$

In the formula, z represents the number of oxygen atoms satisfying a valence, $a+b+c+d=1.5$, $0.1 \leq d \leq 0.4$, and $1.1 \leq [a+b+c] \leq 1.4$, and wherein the negative electrode active material layer contains a negative electrode active material represented by the following formula (4):

[Mathematical formula (3)]

$$\alpha \text{ (Si material)} + \beta \text{ (carbon material)} \quad (4),$$

In the formula, the Si material is formed of one or more kinds selected from the group consisting of Si-containing alloys, a and each represent % by weight of each component in the negative electrode active material layer, and $80 \leq \alpha + \beta \leq 98$, $3 \leq \alpha \leq 40$, and $40 \leq \beta \leq 95$.

* * * * *